United States Patent
Kano et al.

(10) Patent No.: US 12,307,235 B2
(45) Date of Patent: May 20, 2025

(54) TERMINAL CONTROL PROGRAM, TERMINAL APPARATUS, AND REEL INFORMATION MANAGEMENT SYSTEM FOR SETTING FUNCTIONS OF A FISHING ELECTRIC REEL

(71) Applicant: GLOBERIDE, Inc., Tokyo (JP)

(72) Inventors: Shuta Kano, Tokyo (JP); Hiroya Nagasawa, Tokyo (JP)

(73) Assignee: GLOBERIDE, INC., Tokyo (JP)

( * ) Notice: Subject to any disclaimer, the term of this patent is extended or adjusted under 35 U.S.C. 154(b) by 297 days.

(21) Appl. No.: 18/097,940

(22) Filed: Jan. 17, 2023

(65) Prior Publication Data
US 2023/0225305 A1 Jul. 20, 2023

(30) Foreign Application Priority Data

Jan. 19, 2022 (JP) .................................. 2022-006454

(51) Int. Cl.
*H04W 4/80* (2018.01)
*G06F 3/04847* (2022.01)
(Continued)

(52) U.S. Cl.
CPC ............ *G06F 8/65* (2013.01); *G06F 3/04847* (2013.01); *G08C 17/02* (2013.01); *H04W 4/80* (2018.02)

(58) Field of Classification Search
None
See application file for complete search history.

(56) References Cited

U.S. PATENT DOCUMENTS 7,523,881 B2 * 4/2009 Hitomi ................. A01K 89/017
242/223
9,585,375 B2 * 3/2017 Miyamae .......... H04M 1/72415
(Continued)

FOREIGN PATENT DOCUMENTS

CN 1359616 A 7/2002
JP 2003310117 A 11/2003
(Continued)

OTHER PUBLICATIONS

Nov. 21, 2024 Office Action issued in Japanese Patent Application No. 2022-006454.
(Continued)

*Primary Examiner* — Henry Orr
(74) *Attorney, Agent, or Firm* — Oliff PLC

(57) ABSTRACT

A terminal control program according to the present disclosure causes a terminal apparatus to perform: receiving function setting information that has been automatically transmitted from a fishing electric reel in response to a first request transmitted in response to a user's operation; storing the received function setting information; displaying a first setting screen that the user uses to set each function of the fishing electric reel; and transmitting, to the fishing electric reel, information indicating setting of each of the functions that has been set by the user, and causing the information to be stored as the function setting information, and in the displaying of the first setting screen, an operation object is displayed on the first setting screen in a state where each of the functions has been set on the basis of the stored function setting information, the operation object being used to set each of the functions.

4 Claims, 23 Drawing Sheets

(51) Int. Cl.
    *G06F 8/65*     (2018.01)
    *G08C 17/02*     (2006.01)

(56) References Cited

U.S. PATENT DOCUMENTS

| | | |
|---|---|---|
| 11,940,532 B1* | 3/2024 | Wada .................. G01S 15/96 |
| 2005/0162976 A1* | 7/2005 | Kuriyama ............. A01K 89/00 |
| | | 367/111 |
| 2006/0266860 A1* | 11/2006 | Hitomi ................ A01K 89/017 |
| | | 242/223 |
| 2011/0315802 A1 | 12/2011 | Kuriyama et al. |
| 2020/0107529 A1 | 4/2020 | Ikebukuro |
| 2020/0165109 A1* | 5/2020 | Niitsuma ......... A01K 89/01931 |

FOREIGN PATENT DOCUMENTS

| | | | |
|---|---|---|---|
| JP | 2005-229279 | A | 8/2005 |
| JP | 2014-161240 | A | 9/2014 |
| JP | 5654270 | B2 | 1/2015 |
| JP | 2016-73270 | A | 5/2016 |
| TW | 201132285 | A | 10/2011 |
| TW | 202019280 | A | 6/2020 |
| TW | 202021460 | A | 6/2020 |

OTHER PUBLICATIONS

Jan. 22, 2024 Office Action issued in Taiwanese Patent Application No. 111150245.

* cited by examiner

| INFORMATION TYPE | REEL INFORMATION |
|---|---|
| MODEL (PRODUCT NAME) | ABC 500J |
| REGISTRATION NAME | ○○○○ |
| REAL FISHING HISTORY (WINDING LENGTH) | 430 |
| REAL FISHING HISTORY (USE TIME PERIOD) | 54 |
| LINE INPUT HISTORY 1 | ▽▽NO.2, 300 |
| LINE INPUT HISTORY 2 | ▽▽NO.2, 300 |
| ... | ... |
| AFTER-SALES SERVICE HISTORY 1 | ... |
| AFTER-SALES SERVICE HISTORY 2 | ... |
| ... | ... |
| VERSION | 2.03.2 |
| ... | ... |

FIG. 6

TERMINAL CONTROL PROGRAM, TERMINAL APPARATUS, AND REEL INFORMATION MANAGEMENT SYSTEM FOR SETTING FUNCTIONS OF A FISHING ELECTRIC REEL

CROSS-REFERENCE TO RELATED APPLICATION

This application claims priority under 35 U.S.C. § 119 to Japanese Patent Application No. 2022-006454 filed on Jan. 19, 2022 in the Japanese Patent Office, the entire contents of which is hereby incorporated by reference.

FIELD

The present disclosure relates to a terminal control program, a terminal apparatus, and a reel information management system for processing information relating to a fishing electric reel.

BACKGROUND

Conventionally, a fishing electric reel that is controlled according to a reel control program has been known. Such a fishing electric reel includes a storage device, such as a read only memory (ROM), that stores the reel control program, and a control device, such as a central processing unit (CPU), that controls various operations of the fishing electric reel according to a command of the reel control program.

In recent years, the fishing electric reel can perform communication with an external terminal apparatus, and information can be transmitted or received between the fishing electric reel and the external terminal apparatus. For example, JP 2003-310117 A describes a system that includes a fishing electric reel that stores version information of a reel control program, the use history of the fishing electric reel, and the like, and an external terminal apparatus that reads various types of information stored in the fishing electric reel.

SUMMARY

However, in the system described in JP 2003-310117 A, in a case where a user desires to change settings of the fishing electric reel, it is requested that the user operate an operation key included in the fishing electric reel to change the settings, and this causes a problem in which a burden of a complicated operation is imposed on the user. Furthermore, in the external terminal apparatus described in JP 2003-310117 A, setting information of the fishing electric reel that has been stored in the fishing electric reel fails to be changed.

The present disclosure has been made to solve such conventional problems, and it is an object of the present disclosure to provide a terminal control program or the like that enables users themselves to perform a simple operation to manage information relating to a fishing electric reel.

A terminal control program according to the present disclosure is a terminal control program of a terminal apparatus that can display a screen for setting function setting information relating to a function of a fishing electric reel controlled according to a reel control program, the terminal control program causing the terminal apparatus to perform: transmitting a first request to the fishing electric reel in response to an operation of a user, the first request requesting that the function setting information relating to the function of the fishing electric reel be transmitted; receiving the function setting information that has been automatically transmitted from the fishing electric reel in response to the first request; storing the function setting information that has been received; displaying a first setting screen that the user uses to set each of a plurality of the functions of the fishing electric reel; and transmitting, to the fishing electric reel, information indicating setting of each of the plurality of the functions that has been set by the user, and causing the information indicating the setting of each of the plurality of the functions to be stored as the function setting information, in which in the displaying of the first setting screen, an operation object is displayed on the first setting screen in a state where each of the plurality of the functions has been set on the basis of the function setting information that has been stored, the operation object being used to set each of the plurality of the functions.

A terminal apparatus according to the present disclosure is a terminal apparatus that can display a screen for setting function setting information relating to a function of a fishing electric reel controlled according to a reel control program, the terminal apparatus comprising: a terminal transmitter that transmits information to the fishing electric reel; a terminal receiver that receives the information from the fishing electric reel; a storage processing unit; and a display processing unit, in which the terminal transmitter transmits a first request to the fishing electric reel in response to an operation of a user, the first request requesting that the function setting information relating to the function of the fishing electric reel be transmitted, the terminal receiver receives the function setting information that has been automatically transmitted from the fishing electric reel in response to the first request, the storage processing unit stores the function setting information that has been received, the display processing unit displays a first setting screen that the user uses to set each of a plurality of the functions of the fishing electric reel, the terminal transmitter transmits, to the fishing electric reel, information indicating setting of each of the plurality of the functions that has been set by the user, and causing the information indicating the setting of each of the plurality of the functions to be stored as the function setting information, and in the displaying of the first setting screen, an operation object is displayed on the first setting screen in a state where each of the plurality of the functions has been set on the basis of the function setting information that has been stored, the operation object being used to set each of the plurality of the functions.

A reel information management system according to the present disclosure is a reel information management system comprising: a fishing electric reel that is controlled according to a reel control program; and a terminal apparatus that can display a screen for setting function setting information relating to a function of the fishing electric reel, in which the fishing electric reel comprises: a reel storage that stores the function setting information relating to the function of the fishing electric reel; a reel receiver that receives request information from the terminal apparatus; a reel transmitter that transmits information to the terminal apparatus; and a setting unit, the terminal apparatus comprises: a terminal transmitter that transmits the information to the fishing electric reel; a terminal receiver that receives the information from the fishing electric reel; a storage processing unit; and a display processing unit, the terminal transmitter transmits a first request to the fishing electric reel in response to an operation of a user, the first request requesting that the function setting information relating to the function of the fishing electric reel be transmitted, the reel receiver receives the first request that has been transmitted from the terminal apparatus, the reel transmitter transmits the function setting information that has been stored in the reel storage to the terminal apparatus, in response to the first request, the terminal receiver receives the function setting information that has been transmitted from the fishing electric reel, the storage processing unit stores the function setting information that has been received, the display processing unit displays a first setting screen that the user uses to set each of a plurality of the functions of the fishing electric reel, the terminal transmitter transmits, to the fishing electric reel, information indicating setting of each of the plurality of the functions that has been set by the user, and causing the information indicating the setting of each of the plurality of the functions to be stored as the function setting information, the reel receiver receives the information indicating the setting of each of the plurality of the functions and having been transmitted from the terminal apparatus, and the setting unit stores, in the reel storage, the information indicating the setting of each of the plurality of the functions as the function setting information, the information indicating the setting of each of the plurality of the functions having been received.

A terminal control program, a terminal apparatus, and a reel information management system according to the present disclosure enable users themselves to perform a simple operation to manage information relating to a fishing electric reel.

BRIEF DESCRIPTION OF THE DRAWINGS

FIG. 6 is a diagram illustrating an example of a data structure of reel information;

DETAILED DESCRIPTION

Figure 1:
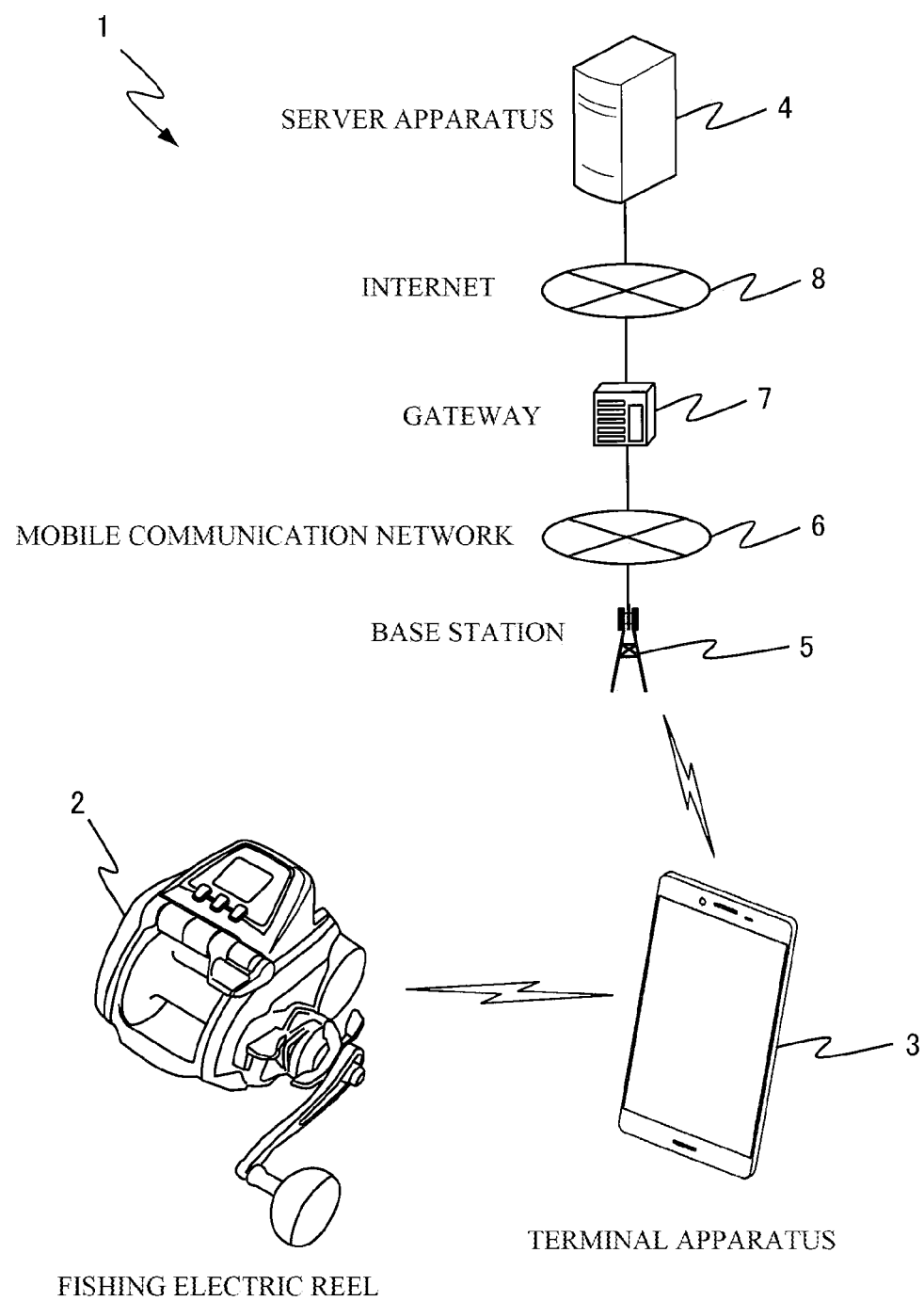
FIG. 1 is a diagram illustrating an example of a general configuration of a reel information management system.

FIG. 1 is a diagram illustrating an example of a general configuration of a reel information management system 1. The reel information management system 1 comprises a fishing electric reel 2, a terminal apparatus 3, and a server apparatus 4. Communication is performed between the fishing electric reel 2 and the terminal apparatus 3 on the basis of, for example, short-range wireless communication, and the fishing electric reel 2 and the terminal apparatus 3 within an arrival range of radio establish wireless communication, and directly perform wireless communication. The terminal apparatus 3 and the server apparatus 4 are connected to each other, for example, via a communication network, such as a base station 5, a mobile communication network 6, a gateway 7, and the Internet 8, and communication is performed on the basis of a predetermined communication protocol (hypertext transfer protocol (HTTP) or the like). The reel information management system 1 may comprise a plurality of fishing electric reels 2 and/or a plurality of terminal apparatuses 3. In this case, the plurality of terminal apparatuses 3 can perform communication (is communicable) with a single fishing electric reel 2, and a single terminal apparatus 3 can perform communication (is communicable) with the plurality of fishing electric reels 2.

The fishing electric reel 2 has a control function for controlling the driving speed of a driving motor 26 that drives and rotates a spool, in accordance with various commands of a reel control program, a storage function for storing reel information relating to the fishing electric reel 2, and the like. The reel information comprises, for example, model information indicating a product name of the fishing electric reel 2, registration name information indicating a registration name that has been set by a user, real fishing history information indicating real fishing history (a winding-up length, a time period of use, or the like), line input information indicating input history (a type and a number of a line, a wound-line length (m), and the like) relating to a fishing line that has been input in the past, service history information indicating after-sales service history that has been set by a person in charge of after-sales service, setting information (function setting information) of various functions that are achieved according to the reel control program, and version information indicating a version of the reel control program. Note that the reel information may include some of these various types of information, or may include another piece of information relating to the fishing electric reel 2.

The terminal apparatus 3 is an information processing apparatus such as a smartphone. The terminal apparatus 3 may be a mobile phone, a tablet terminal, a tablet personal computer (PC), an electronic book reader, a wearable computer, or the like. The terminal apparatus 3 may be a portable game machine, a game console, a laptop PC, or the like.

In FIG. 1, a single server apparatus 4 is illustrated as a component of the reel information management system 1, but the server apparatus 4 may be a set of a plurality of server apparatuses (computers) that is physically separated from each other. In this case, each of the plurality of server apparatuses may have the same function, or may have a distributed function of a single server apparatus 4.

Figure 2:
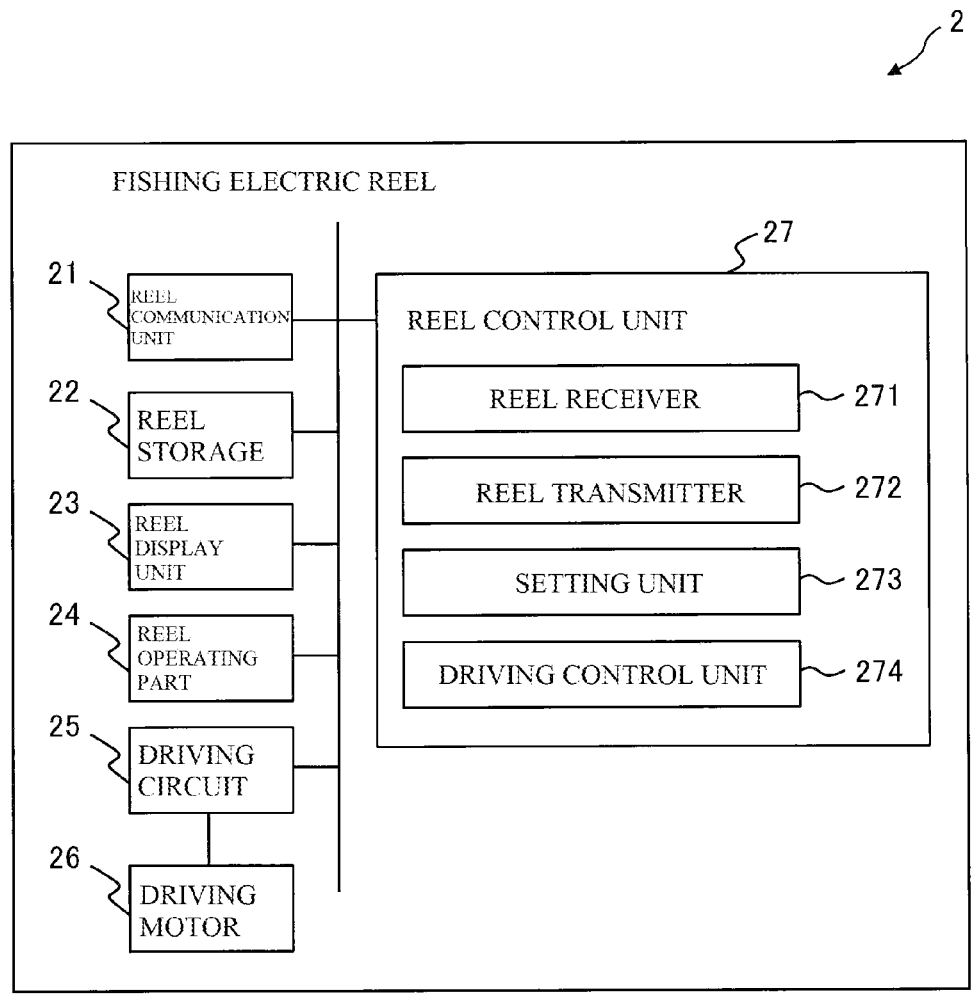
FIG. 2 is a diagram illustrating an example of a general configuration of a fishing electric reel.
Figure 3:
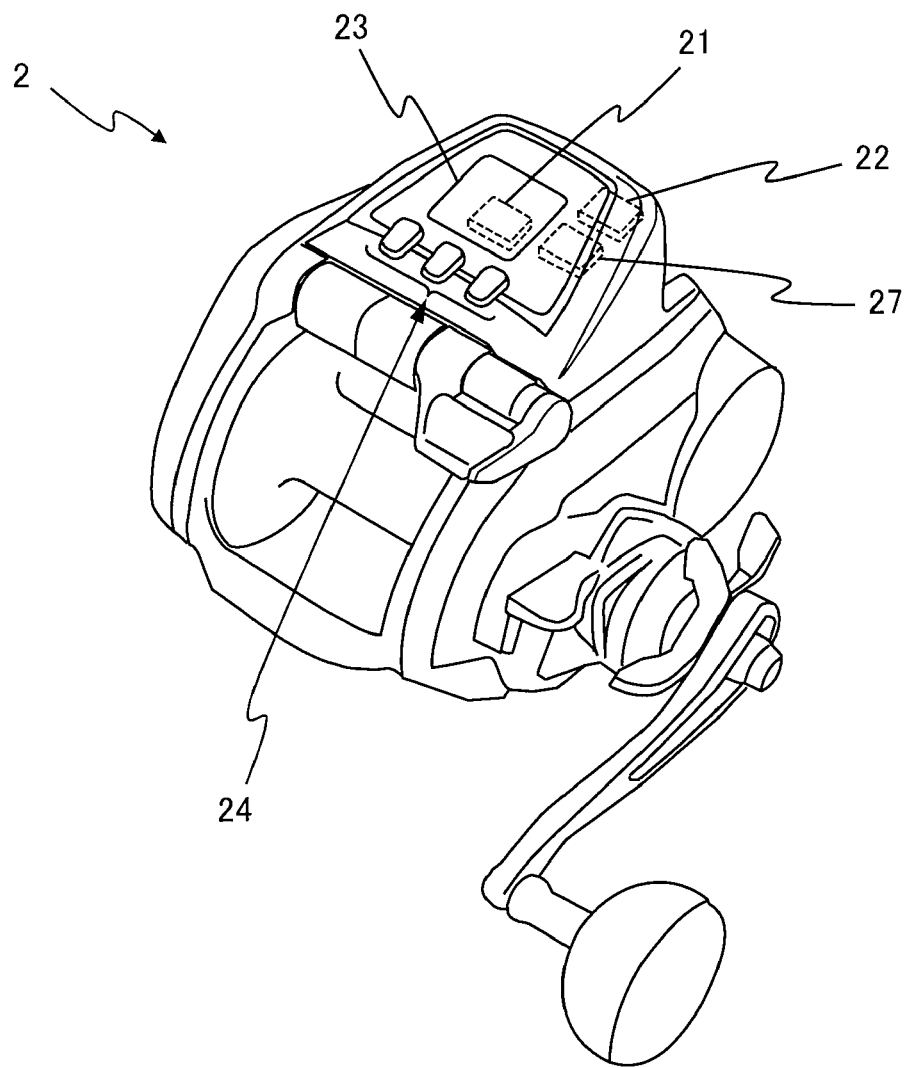
FIG. 3 is a perspective view of an example of the fishing electric reel.

FIG. 2 is a diagram illustrating an example of a general configuration of the fishing electric reel 2, and FIG. 3 is a perspective view of an example of the fishing electric reel 2. For example, the fishing electric reel 2 can transmit, to the terminal apparatus 3, reel information including the version information of the reel control program, and can receive, from the terminal apparatus 3, a latest reel control program and reel information that has been set by a user. Therefore, the fishing electric reel 2 comprises a reel communication unit 21, a reel storage 22, a reel display unit 23, a reel operating part 24, a driving circuit 25, a driving motor 26, and a reel control unit 27. The fishing electric reel 2 included in the reel information management system 1 is not limited to the fishing electric reel 2 illustrated in FIGS. 2 and 3, and any fishing electric reel may be used if the technology disclosed in the present embodiment is applicable.

The reel communication unit 21 comprises a communication interface circuit including an antenna having a 13.56 MHz band as a sensitive band, and establishes short-range wireless communication according to the near field communication (NFC) scheme or the like with the terminal apparatus 3. A communication scheme between the fishing electric reel 2 and the terminal apparatus 3 may be short-range wireless communication according to another communication scheme such as the Bluetooth (registered trademark) communication scheme. A frequency band of the reel communication unit 21 is not limited to the frequency band described above.

The reel storage 22 comprises, for example, a semiconductor memory device such as a read only memory (ROM) or a random access memory (RAM). The reel storage 22 stores a reel control program that is used in processing performed by the reel control unit 27, reel information, and the like. The reel display unit 23 is a liquid crystal display, and displays a still image or the like that corresponds to image data supplied from the reel control unit 27. The reel operating part 24 is one or more operation buttons, and generates a signal that corresponds to pressing performed by a user. The generated signal is supplied as the user's instruction to the reel control unit 27.

The driving circuit 25 is a motor driver that adjusts an amount of a current to the driving motor 26 in response to a control signal from the reel control unit 27, and controls the rotation driving of the driving motor 26. The driving motor 26 is a driving device that drives and rotates the spool (not illustrated). Due to the rotation driving of the driving motor 26, the spool is driven to rotate in a fishing line winding-up direction by using a power transmission mechanism (not illustrated).

The reel control unit 27 comprises one or more processors, and a peripheral circuit of the one or more processors. The reel control unit 27 comprehensively controls the entire operation of the fishing electric reel 2, and is, for example, a central processing unit (CPU). The reel control unit 27 controls the reel communication unit 21, the reel display unit 23, the driving circuit 25, and the like in such a way that various types of processing of the fishing electric reel 2 are performed in an appropriate procedure on the basis of the reel control program stored in the reel storage 22, an operation performed on the reel operating part 24, or the like.

The reel control unit 27 comprises a reel receiver 271, a reel transmitter 272, a setting unit 273, and a driving control unit 274. These respective units included in the reel control unit 27 are function modules that are implemented by the reel control program that is executed on the processor included in the reel control unit 27. Details of functions of the reel receiver 271, the reel transmitter 272, the setting unit 273, and the driving control unit 274 will be described later.

Figure 4:
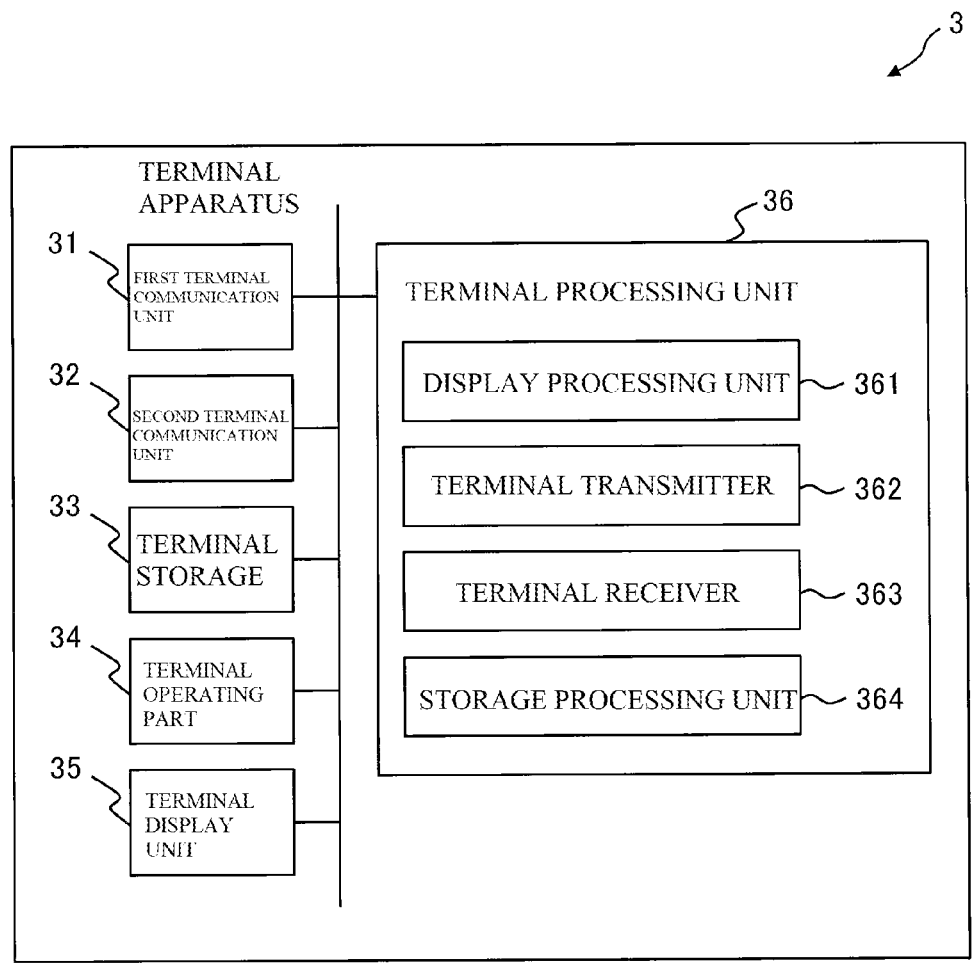
FIG. 4 is a diagram illustrating an example of a general configuration of a terminal apparatus.

FIG. 4 is a diagram illustrating an example of a general configuration of the terminal apparatus 3. The terminal apparatus 3 can perform various types of processing, such as setting of reel information relating to the fishing electric reel 2, transmission or reception of information to/from the fishing electric reel 2, or transmission or reception of information to/from the server apparatus 4. Therefore, the terminal apparatus 3 comprises a first terminal communication unit 31, a second terminal communication unit 32, a terminal storage 33, a terminal operating part 34, a terminal display unit 35, and a terminal processing unit 36.

The first terminal communication unit 31 comprises a communication interface circuit including an antenna having a 13.56 MHz band as a sensitive band, and establishes short-range wireless communication according to the NFC scheme or the like with the fishing electric reel 2. A communication scheme between the fishing electric reel 2 and the terminal apparatus 3 may be short-range wireless communication according to another communication scheme such as the Bluetooth (registered trademark) communication scheme. A frequency band of the first terminal communication unit 31 is not limited to the frequency band described above.

The second terminal communication unit 32 comprises a communication interface circuit including an antenna having a 2.1 GHz band as a sensitive band, and connects the terminal apparatus 3 to a communication network. The second terminal communication unit 32 establishes a wireless signal line according to the long term evolution (LTE) scheme or the like with the base station 5 via a channel allocated by the base station 5, and performs communication with the base station 5.

A communication scheme between the second terminal communication unit 32 and the base station 5 may be another communication scheme such as the code division multiple access (CDMA) scheme or the wideband code division multiple access (W-CDMA) scheme. The communication scheme between the second terminal communication unit 32 and the base station 5 may be the 5th generation (5G) mobile communication system or the like. The communication scheme between the second terminal communication unit 32 and the base station 5 may be another communication scheme such as the personal handy-phone system (PHS). A frequency band of the second terminal communication unit 32 is not limited to the frequency band described above.

The terminal storage 33 comprises, for example, a semiconductor memory device such as a ROM or a RAM. The terminal storage 33 stores an application program, such as a terminal control program, that is used in processing performed by the terminal processing unit 36, various types of information, or the like. Various programs, such as the terminal control program, that are stored in the terminal storage 33 may be installed in the terminal storage 33, for example, by using a publicly known setup program or the like that has been transmitted from an external server apparatus or the like.

The terminal operating part 34 is, for example, a pointing device such as a touch panel. The terminal operating part 34 may be any device if the terminal apparatus 3 can be operated, and may be, for example, a keypad. A user can input a character, a number, and a symbol, a position on a display screen of the terminal display unit 35, or the like, by using the terminal operating part 34. If the user has operated the terminal operating part 34, the terminal operating part 34 generates a signal that corresponds to the user's operation, and the generated signal is supplied as the user's instruction to the terminal processing unit 36.

The terminal display unit 35 is a liquid crystal display. Note that the terminal display unit 35 may be an organic electro-luminescence (EL) display or the like. The terminal display unit 35 displays a video that corresponds to video data supplied from the terminal processing unit 36, a moving image that corresponds to moving image data, a still image that corresponds to still image data, or the like.

The terminal processing unit 36 comprises one or more processors, and a peripheral circuit of the one or more processors. The terminal processing unit 36 comprehensively controls the entire operation of the terminal apparatus 3, and is, for example, a CPU. The terminal processing unit 36 controls the first terminal communication unit 31, the second terminal communication unit 32, the terminal display unit 35, and the like in such a way that various types of processing of the terminal apparatus 3 are performed in an appropriate procedure on the basis of the terminal control program stored in the terminal storage 33, an operation performed on the terminal operating part 34, or the like.

The terminal processing unit 36 comprises a display processing unit 361, a terminal transmitter 362, a terminal receiver 363, and a storage processing unit 364. These respective units included in the terminal processing unit 36 are function modules that are implemented by the terminal control program that is executed on the processor included in the terminal processing unit 36. Alternatively, these respective units included in the terminal processing unit 36 may be implemented in the terminal apparatus 3, as an independent integrated circuit, a microprocessor, or firmware. Details of functions of the display processing unit 361, the terminal transmitter 362, the terminal receiver 363, and the storage processing unit 364 will be described later.

Figure 5:
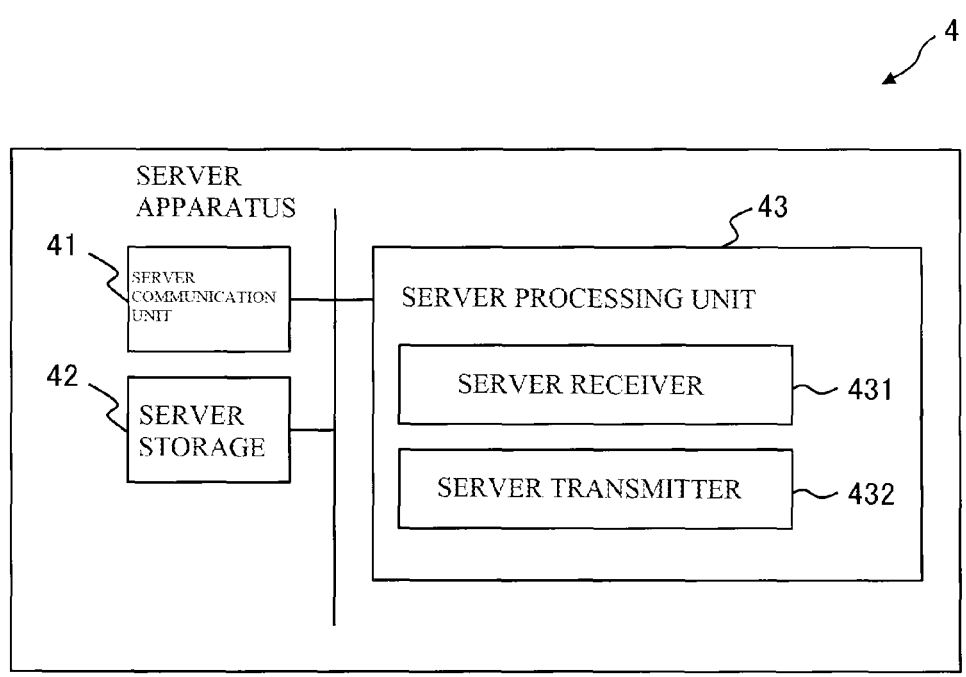
FIG. 5 is a diagram illustrating an example of a general configuration of a server apparatus.

FIG. 5 is a diagram illustrating an example of a general configuration of the server apparatus 4. The server apparatus 4 has a function of managing a reel control program of the latest version for each model of the fishing electric reel 2, and proving a user with the reel control program of the latest version. In order to achieve this function, the server apparatus 4 comprises a server communication unit 41, a server storage 42, and a server processing unit 43.

The server communication unit 41 comprises a communication interface circuit for connecting the server apparatus 4 to the Internet 8. The server communication unit 41 supplies the server processing unit 43 with information received from the terminal apparatus 3. The server communication unit 41 transmits, to the terminal apparatus 3, information supplied from the server processing unit 43.

The server storage 42 comprises, for example, at least one of a semiconductor memory device, a magnetic disk device, and an optical disk device. The server storage 42 stores an application program, such as a server control program, that is used in processing performed by the server processing unit 43, various types of information, or the like. The application program such as the server control program may be installed in the server storage 42 from a computer-readable portable recording medium, such as a CD-ROM or a DVD-ROM, by using a publicly known setup program or the like. The server storage 42 stores the reel control program of the latest version and latest version information indicating the latest version, for each of the models of the fishing electric reel 2.

The server processing unit 43 comprises one or more processors, and a peripheral circuit of the one or more processors. The server processing unit 43 comprehensively controls the entire operation of the server apparatus 4, and is, for example, a CPU. The server processing unit 43 controls the server communication unit 41 or the like in such a way that various types of processing of the server apparatus 4 are performed in an appropriate procedure in accordance with the server control program or the like stored in the server storage 42.

The server processing unit 43 comprises a server transmitter 432 and a server receiver 431. These respective units included in the server processing unit 43 are function modules that are implemented by the server control program that is executed on the processor included in the server processing unit 43. Alternatively, these respective units included in the server processing unit 43 may be implemented in the server apparatus 4, as an independent integrated circuit, a microprocessor, or firmware. Details of functions of the server transmitter 432 and the server receiver 431 will be described later.

FIG. 6 is a diagram illustrating an example of a data structure of the reel information. The reel information comprises model information, registration name information, real fishing history information, line input information, service history information, version information, or the like. The reel information is information stored in the reel storage 22. The reel information may be stored in the terminal storage 33 of the terminal apparatus 3 possessed by a user of the fishing electric reel 2, or may be stored in the server storage 42 of the server apparatus 4 in association with identification information (user identification (ID) or the like) of the user of the fishing electric reel 2. Note that the reel information may include the function setting information described later.

The model information is character string information indicating a product name of the fishing electric reel 2 that has been set by a manufacturer or the like of the fishing electric reel 2 before the sale of the fishing electric reel 2. The registration name information is character string information indicating a registration name that has been set according to an operation performed by a user on the registration name setting screen 1100 described later. The real fishing history information is numerical value information indicating a winding-up length (m), and numerical value information indicating a time period of use of the driving motor 26, and these pieces of numerical value information have been calculated by the reel control unit 27 on the basis of sensor information from a sensor (not illustrated) that detects the rotation of the spool or the driving motor 26. The line input information is character string information indicating a type and a number of a line, and numerical value information indicating a wound-line length (m). The type and the number of the line and the wound-line length have been set according to an operation performed by a user on the line input screen 910 described later. The service history information is character string information indicating the content of after-sales service that a person in charge of the after-sales service has been set when the person has provided the after-sales service of the fishing electric reel 2. The version information is character string information indicating the version of a reel control program that is currently used in the fishing electric reel 2.

As the reel information, character string information in which respective pieces of information are arranged in a predetermined order (for example, "ABC 500J", "oooo", "430", "54", "VV no. 2, 300" . . . ) is stored. As the reel information, information in which information identifying each information type is associated with corresponding reel information may be stored. Note that in the case of the absence of information that corresponds to information type (for example, in a case where five pieces of line input information can be input, but only two pieces of line input information have been set), information indicating the absence of the information is stored.

Figure 13:
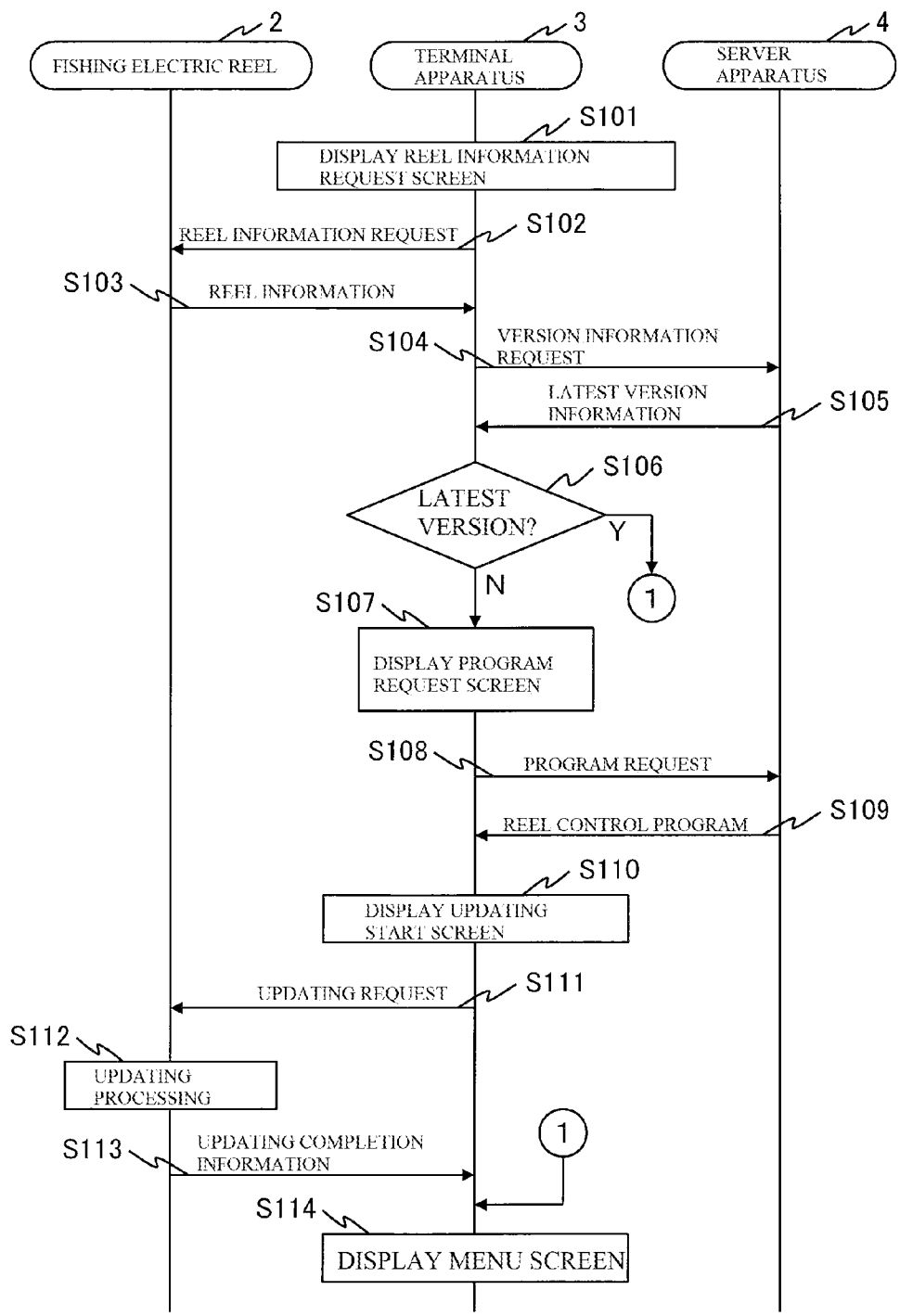
FIG. 13 is a diagram illustrating an example of an operation sequence of the reel information management system.

An example of the operation sequence illustrated in FIG. 13 of the reel information management system 1, examples of functions of the reel receiver 271, the reel transmitter 272, the setting unit 273, and the driving control unit 274, examples of functions of the display processing unit 361, the terminal transmitter 362, the terminal receiver 363, and the storage processing unit 364, and examples of functions of the server transmitter 432 and the server receiver 431 are described below with reference to FIGS. 7A to 9A.

As illustrated in FIG. 13, first, in a case where a user has input an instruction to display a reel information request screen 700, by using the terminal operating part 34 of the terminal apparatus 3, the display processing unit 361 of the terminal apparatus 3 displays the reel information request screen 700 in the terminal display unit 35 (step S101). The instruction to display the reel information request screen 700 is input, for example, in a case where the user has operated the terminal operating part 34 to provide an instruction to a display instruction button in a home screen (not illustrated) displayed in the terminal display unit 35.

Figure 7A:
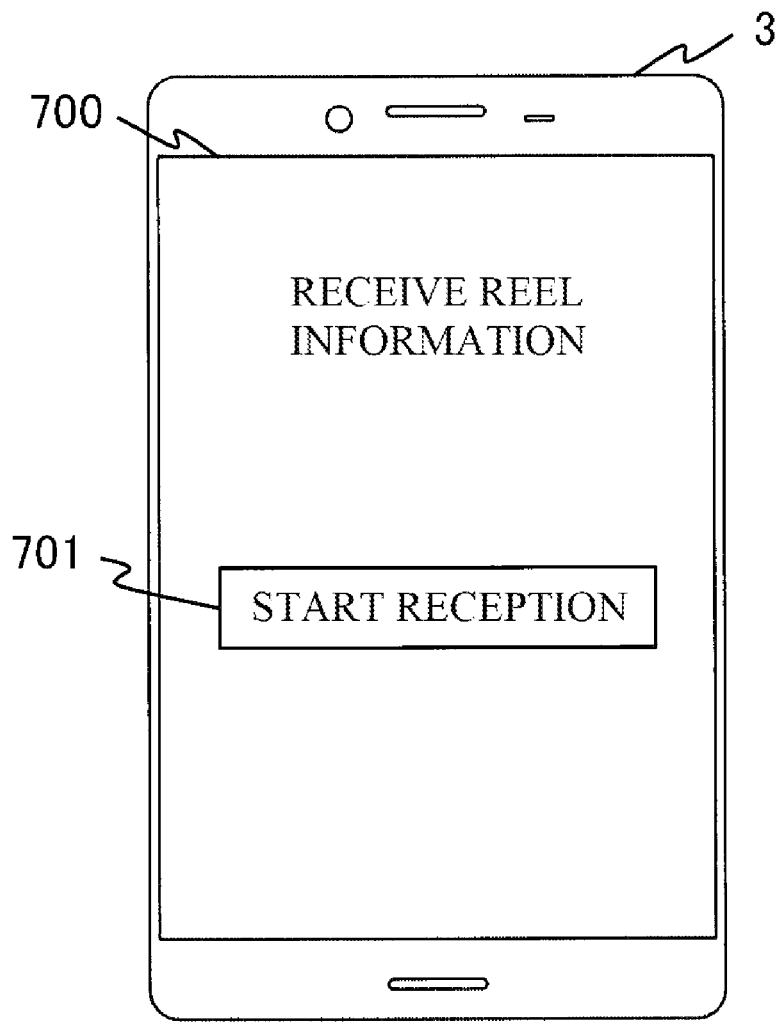
FIG. 7A is a diagram illustrating an example of a reel information request screen displayed in the terminal apparatus.

FIG. 7A is a diagram illustrating an example of the reel information request screen 700 displayed in the terminal apparatus 3. The reel information request screen 700 comprises, for example, a reel information request button 701. The reel information request button 701 is a button object for establishing short-range wireless communication between the fishing electric reel 2 and the terminal apparatus 3, and transmitting, to the fishing electric reel 2, a reel information request requesting that reel information be transmitted.

Figure 7B:
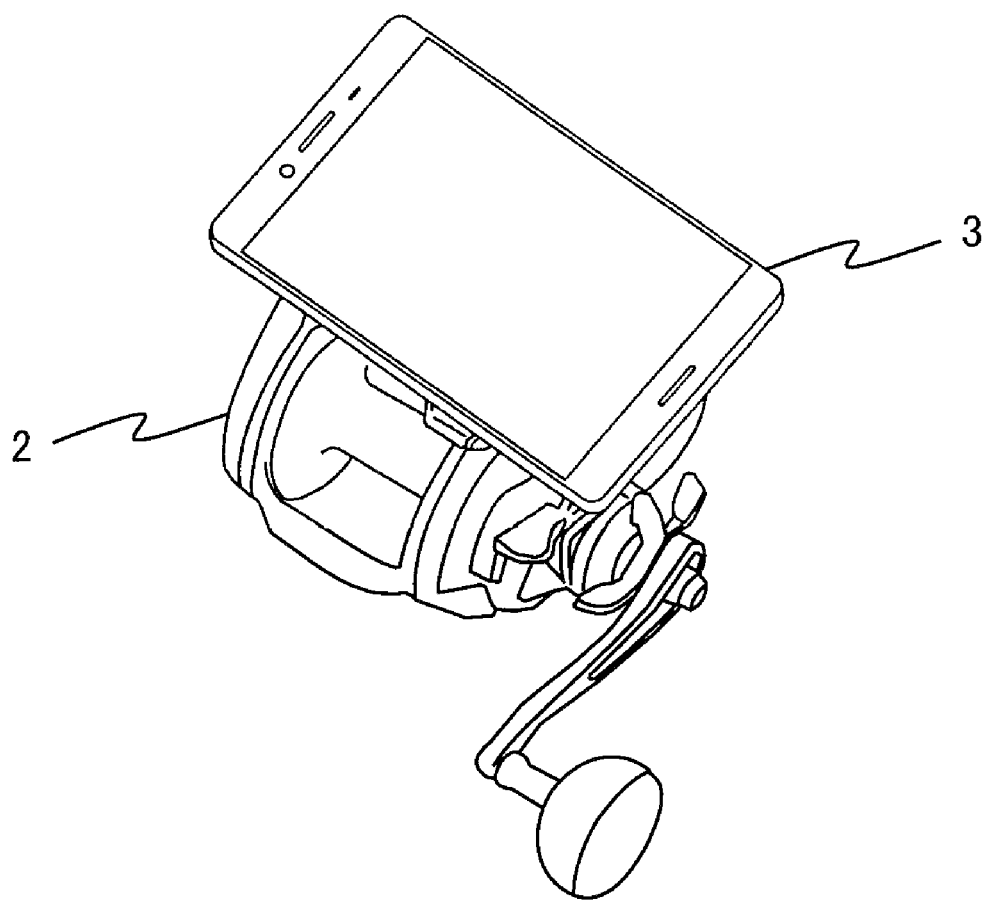
FIG. 7B is a schematic diagram for explaining an example of an operation to establish short-range wireless communication between the fishing electric reel and the terminal apparatus.

Return to FIG. 13. In a case where the user has operated the terminal operating part 34 to provide an instruction to the reel information request button 701, the terminal transmitter 362 of the terminal apparatus 3 transmits a reel information request via the first terminal communication unit 31 (step S102). FIG. 7B is a schematic diagram for explaining an example of an operation to establish short-range wireless communication between the fishing electric reel 2 and the terminal apparatus 3. In the example illustrated in FIG. 7B, short-range wireless communication according to the NFC scheme or the like is established between the reel communication unit 21 of the fishing electric reel 2 and the first terminal communication unit 31 of the terminal apparatus 3. A communication distance of short-range wireless communication according to the NFC scheme or the like is about 10 cm, and the reel communication unit 21 is provided near the reel display unit 23 (FIG. 3). Therefore, a user "holds" the terminal apparatus 3 over the reel display unit 23, and this causes short-range wireless communication to be established.

After short-range wireless communication has been established between the reel communication unit 21 of the fishing electric reel 2 and the first terminal communication unit 31 of the terminal apparatus 3, the reel receiver 271 of the fishing electric reel 2 receives the reel information request that has been transmitted from the terminal apparatus 3, by using the reel communication unit 21. The reel transmitter 272 of the fishing electric reel 2 automatically extracts reel information stored in the reel storage 22 in response to the reception of the reel information request, and transmits the extracted reel information to the terminal apparatus 3 by using the reel communication unit 21 (step S103).

The terminal receiver 363 of the terminal apparatus 3 receives the reel information transmitted from the fishing electric reel 2, by using the first terminal communication unit 31. The storage processing unit 364 of the terminal apparatus 3 stores the received reel information in the terminal storage 33. The terminal transmitter 362 of the terminal apparatus 3 extracts model information included in the stored reel information, and transmits a version information request including the extracted model information, to the server apparatus 4 by using the second terminal communication unit 32 (step S104). The version information request is request information for requesting that the server apparatus 4 transmit, to the terminal apparatus 3, latest version information indicating the latest version of a reel control program of the fishing electric reel 2 of the model indicated by the extracted model information. The terminal transmitter 362 does not always need to cause the version information request to include the extracted model information. In this case, the terminal transmitter 362 transmits the version information request together with the model information.

The server receiver 431 of the server apparatus 4 receives the version information request that has been transmitted from the terminal apparatus 3, by using the server communication unit 41. In response to the reception of the version information request, the server transmitter 432 of the server apparatus 4 extracts the model information included in the version information request (or the server transmitter 432 specifies the model information that has been transmitted together with the version information request). Next, the server transmitter 432 extracts, from the server storage 42, latest version information indicating the latest version of the reel control program of the fishing electric reel 2 of the model indicated by the model information. Then, the server transmitter 432 transmits the extracted latest version information to the terminal apparatus 3 by using the server communication unit 41 (step S105).

The terminal receiver 363 of the terminal apparatus 3 receives the latest version information that has been transmitted from the server apparatus 4, by using the second terminal communication unit 32. As described above, the terminal apparatus 3 transmits a version information request, and therefore the terminal apparatus 3 can receive latest version information that has been automatically transmitted from the server apparatus 4. Next, the display processing unit 361 of the terminal apparatus 3 determines whether version information included in the stored reel information matches the received latest version information (step S106).

In a case where the version information included in the reel information matches the latest version information (step S106—Yes), the process of step S114 is performed. In a case where the version information included in the reel information does not match the latest version information (step S106—No), the display processing unit 361 displays a program request screen 800 in the terminal display unit 35 (step S107).

Figure 8A:
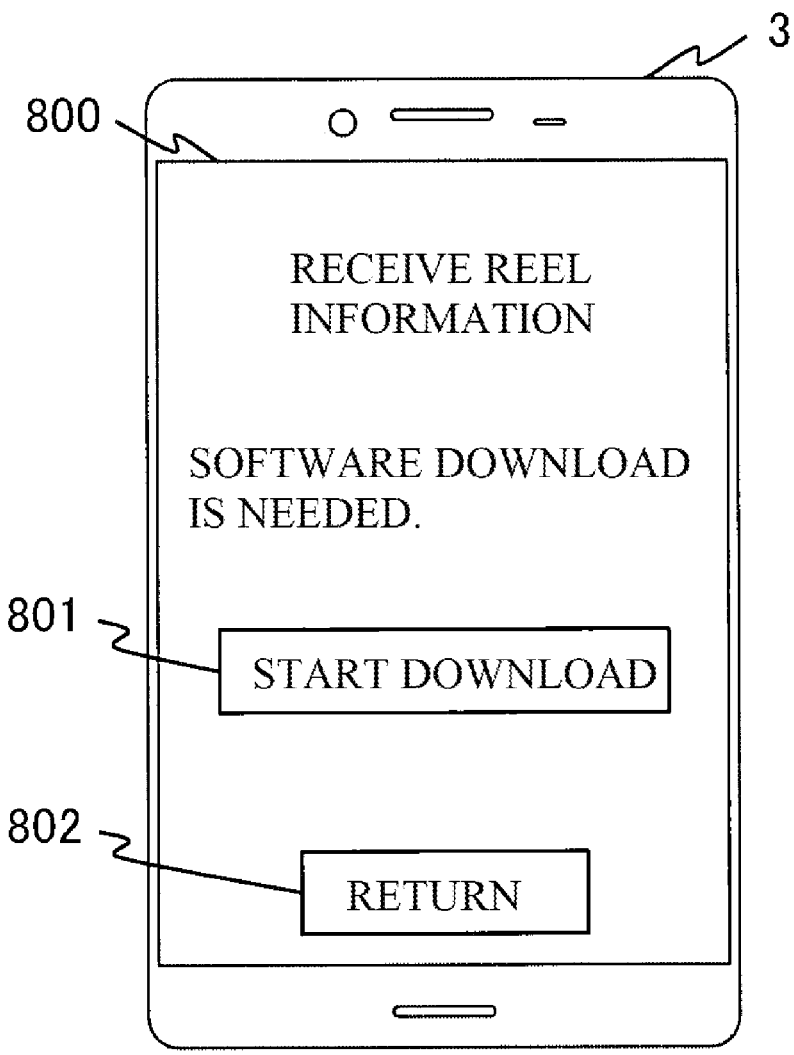
FIG. 8A is a diagram illustrating an example of a program request screen displayed in the terminal apparatus.

FIG. 8A is a diagram illustrating an example of the program request screen 800 displayed in the terminal apparatus 3. The program request screen 800 comprises, for example, a program request button 801 and a return button 802. The program request button 801 is a button object for transmitting, to the server apparatus 4, a program request requesting that a reel control program of the latest version of a reel control program that the fishing electric reel 2 currently uses be transmitted.

Return to FIG. 13. In a case where the user has operated the terminal operating part 34 to provide an instruction to the program request button 801 in the program request screen 800, the terminal transmitter 362 of the terminal apparatus 3 extracts the model information included in the reel information stored in the terminal storage 33. Then, the terminal transmitter 362 transmits a program request including the extracted model information, by using the second terminal communication unit 32 (step S108). The terminal transmitter 362 does not always need to cause the program request to include the extracted model information. In this case, the terminal transmitter 362 transmits the program request together with the model information. Furthermore, in a case where the user has operated the terminal operating part 34 to provide an instruction to the return button 802, the display processing unit 361 of the terminal apparatus 3 terminates a display of the program request screen 800, and displays the home screen (not illustrated) in the terminal display unit 35.

The server receiver 431 of the server apparatus 4 receives the program request that has been transmitted from the terminal apparatus 3, by using the server communication unit 41. In response to the reception of the program request, the server transmitter 432 of the server apparatus 4 extracts the model information included in the received program request (or the server transmitter 432 specifies the model information that has been transmitted together with the program request). Next, the server transmitter 432 extracts, from the server storage 42, the latest reel control program of the fishing electric reel 2 of the model indicated by the model information. Then, the server transmitter 432 transmits the extracted latest reel control program to the terminal apparatus 3 by using the server communication unit 41 (step S109).

The terminal receiver 363 of the terminal apparatus 3 receives the latest reel control program that has been transmitted from the server apparatus 4, by using the second terminal communication unit 32, and stores the latest reel control program in the terminal storage 33. Next, the display processing unit 361 displays an updating start screen 810 in the terminal display unit 35 (step S110).

Figure 8B:
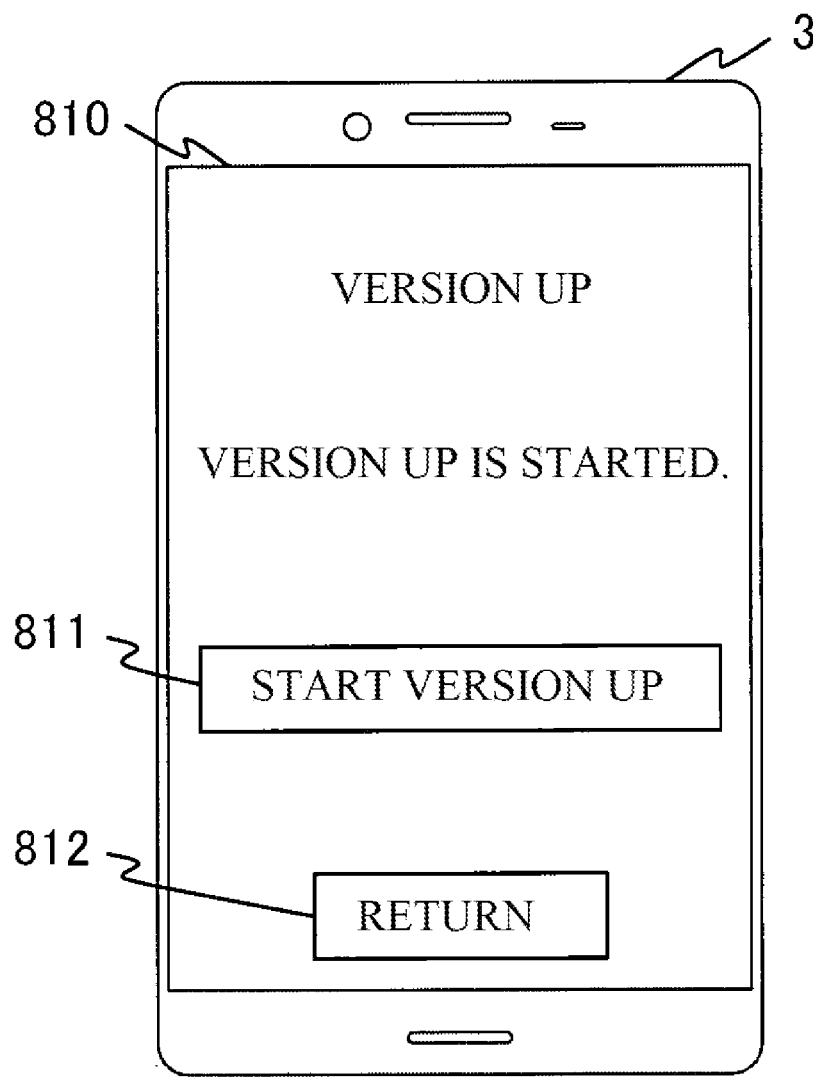
FIG. 8B is a diagram illustrating an example of an updating start screen displayed in the terminal apparatus.

FIG. 8B is a diagram illustrating an example of the updating start screen 810 displayed in the terminal apparatus 3. The updating start screen 810 comprises, for example, an updating start button 811 and a return button 812. The updating start button 811 is a button object for transmitting, to the fishing electric reel 2, an updating request requesting that updating to the latest reel control program be performed.

Return to FIG. 13. In a case where the user has operated the terminal operating part 34 to provide an instruction to the updating start button 811, the terminal transmitter 362 of the terminal apparatus 3 extracts the latest reel control program and the reel information that have been stored in the terminal storage 33. Then, the terminal transmitter 362 transmits an updating request including the latest reel control program and the reel information that have been extracted, by using the first terminal communication unit 31 (step S111). The terminal transmitter 362 does not always need to cause the updating request to include the extracted latest reel control program. In this case, the terminal transmitter 362 transmits the updating request together with the latest reel control program and the reel information. Note that the transmission process of step S111 is performed in a case where short-range wireless communication has been established between the reel communication unit 21 of the fishing electric reel 2 and the first terminal communication unit 31 of the terminal apparatus 3. As described above, in a case where a version of a current reel control program of the fishing electric reel 2 does not match a version of the latest reel control program, the latest reel control program is transmitted from the terminal apparatus 3 to the fishing electric reel 2. Furthermore, in a case where the user has operated the terminal operating part 34 to provide an instruction to the return button 812, the display processing unit 361 of the terminal apparatus 3 terminates a display of the updating start screen 810, and displays the home screen (not illustrated) in the terminal display unit 35.

The reel receiver 271 of the fishing electric reel 2 receives the updating request transmitted from the terminal apparatus 3, by using the reel communication unit 21. The setting unit 273 of the fishing electric reel 2 extracts the latest reel control program and the reel information that are included in the received updating request (or the server transmitter 432 specifies the latest reel control program and the reel information that have been transmitted together with the updating request).

Next, the setting unit 273 of the fishing electric reel 2 performs updating processing for deleting the reel control program and the reel information that have been stored in the reel storage 22, and storing, in the reel storage 22, the latest reel control program and the reel information that have been transmitted (step S112). Then, in response to the termination of the updating processing, the reel transmitter 272 of the fishing electric reel 2 transmits updating completion information for reporting the termination of the updating processing, to the terminal apparatus 3 by using the reel communication unit 21 (step S113).

The terminal receiver 363 of the terminal apparatus 3 receives the updating completion information transmitted from the fishing electric reel 2, by using the first terminal communication unit 31. In response to the reception of the updating completion information, the display processing unit 361 of the terminal apparatus 3 displays a menu screen 900 in the terminal display unit 35 (step S114).

Figure 9A:
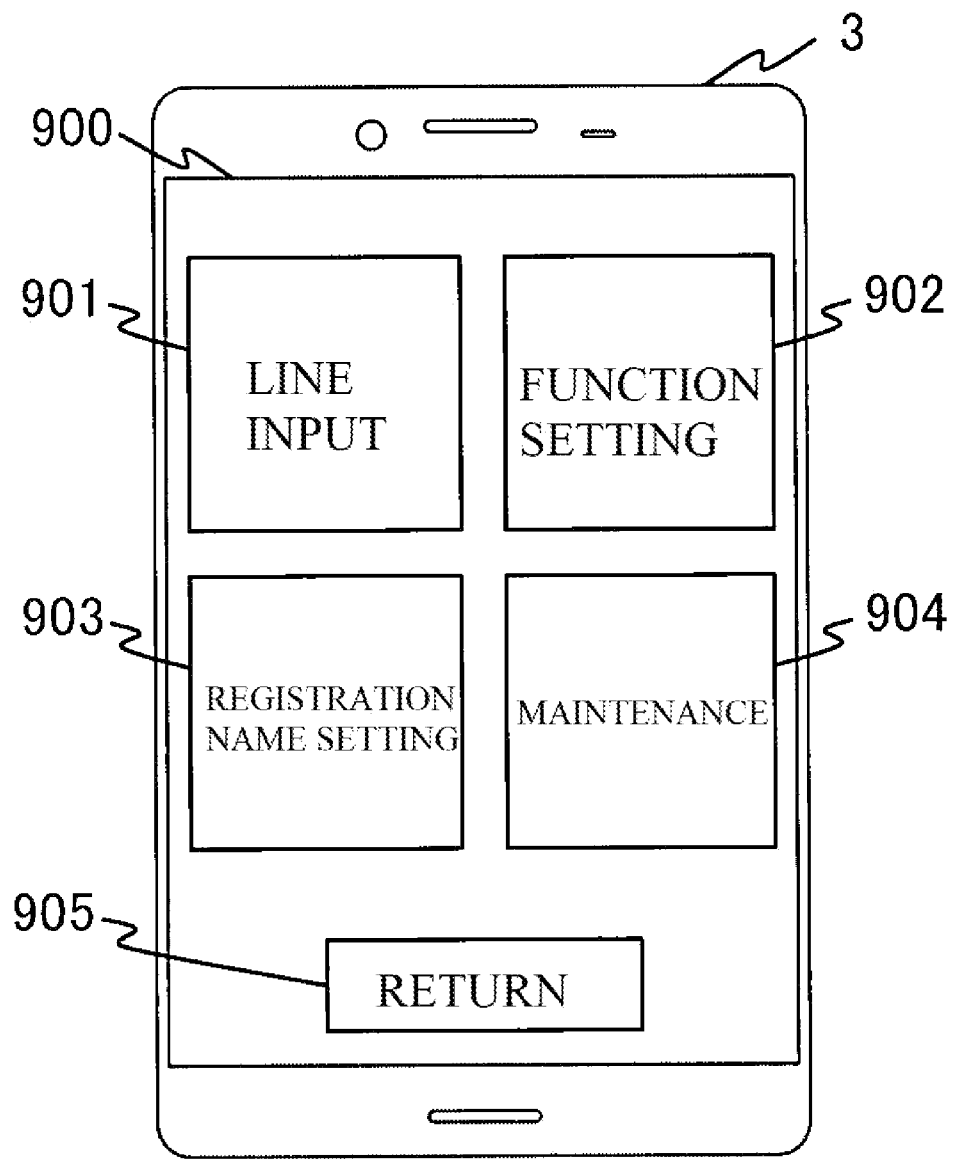
FIG. 9A is a diagram illustrating an example of a menu screen displayed in the terminal apparatus.

FIG. 9A is a diagram illustrating an example of the menu screen 900 displayed in the terminal apparatus 3. The menu screen 900 comprises, for example, a line input button 901, a function setting button 902, a registration name setting button 903, a maintenance display button 904, and a return button 905. The line input button 901 is a button object for displaying a line input screen 910. The function setting button 902 is a button object for displaying a function setting screen 1010. The registration name setting button 903 is a button object for displaying a registration name setting screen 1100. The maintenance display button 904 is a button object for displaying a maintenance screen 1110. The menu screen 900, the line input screen 910, the function setting screen 1010, the registration name setting screen 1100, and the maintenance screen 1110 are examples of a screen for setting or displaying reel information relating to the fishing electric reel 2.

Figure 14A:
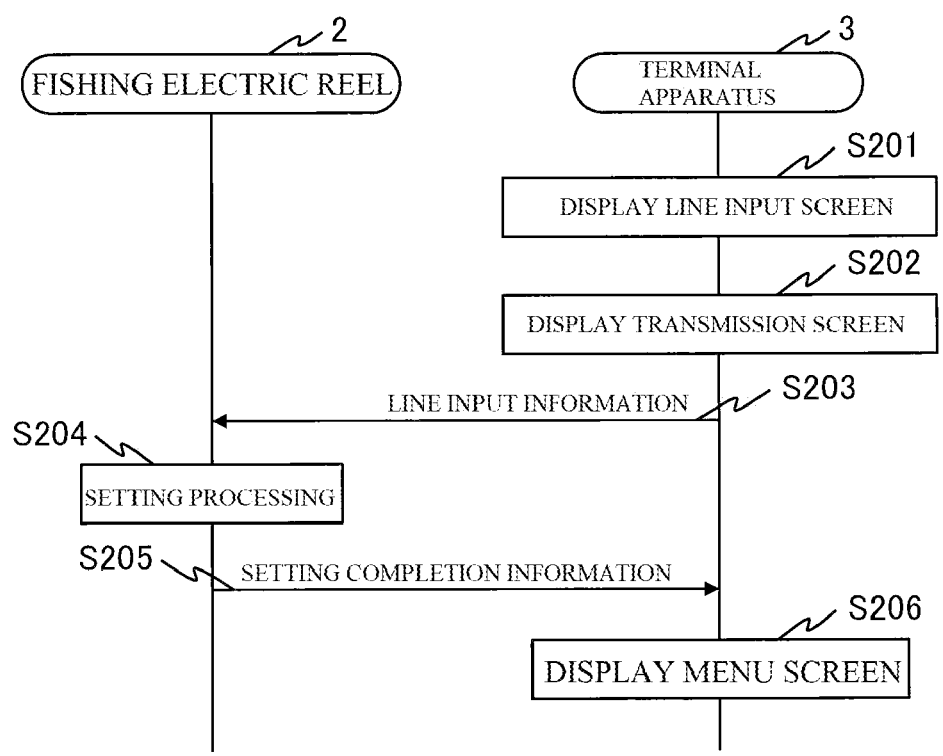
FIG. 14A is a diagram illustrating another example of the operation sequence of the reel information management system.

Another example of the operation sequence performed by the reel information management system 1 relating to processing for setting the line input information, as illustrated in FIG. 14A, is described below with reference to FIGS. 9B and 10A.

As illustrated in FIG. 14A, first, in a case where a user has input an instruction to display the line input screen 910, by using the terminal operating part 34 of the terminal apparatus 3, the display processing unit 361 of the terminal apparatus 3 displays the line input screen 910 in the terminal display unit 35 (step S201). The instruction to display the line input screen 910 is input, for example, in a case where the user has operated the terminal operating part 34 to provide an instruction to the line input button 901 in the menu screen 900 displayed in the terminal display unit 35.

Figure 9B:
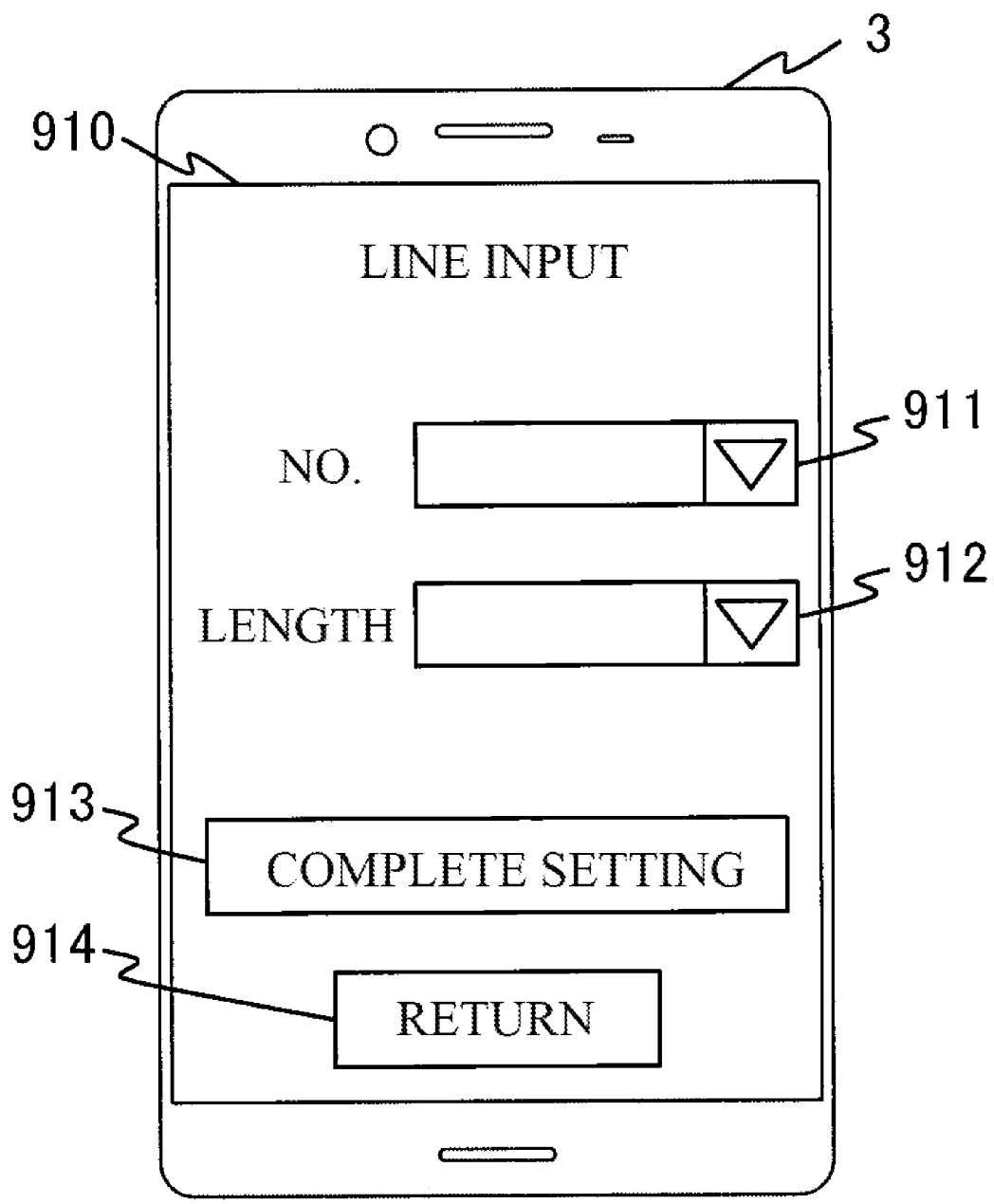
FIG. 9B is a diagram illustrating an example of a line input screen displayed in the terminal apparatus.
Figure 10A:
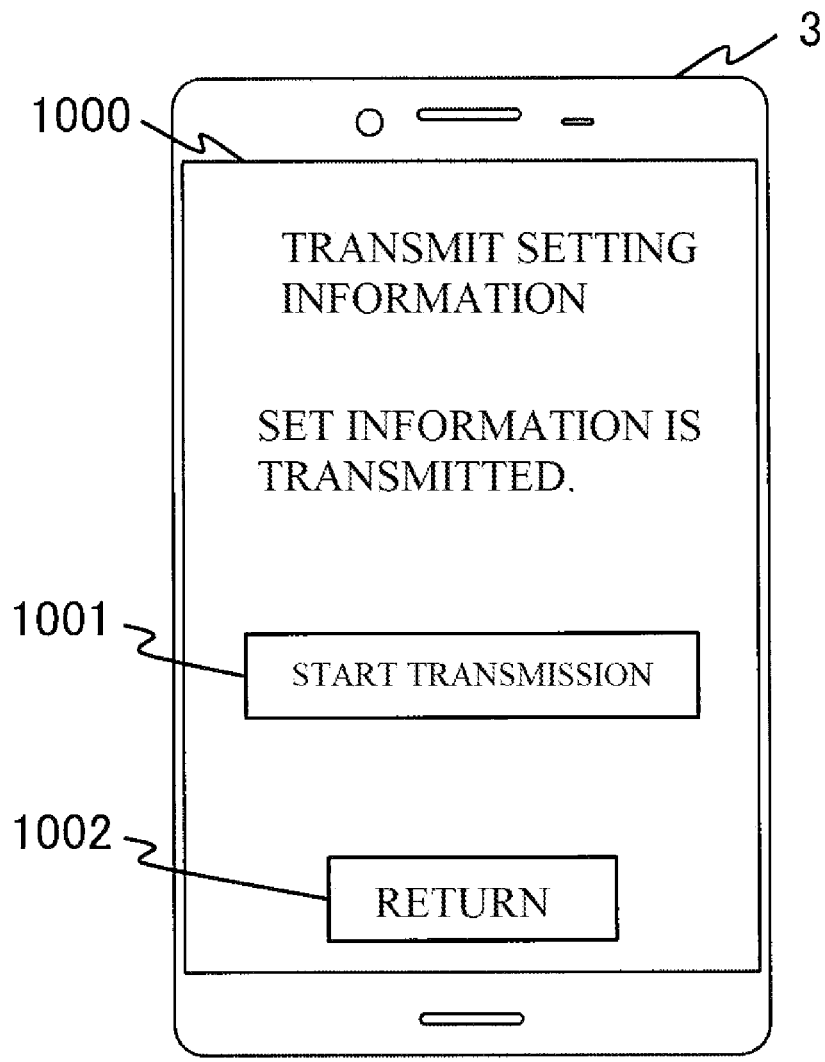
FIG. 10A is a diagram illustrating an example of a transmission screen displayed in the terminal apparatus.

FIG. 9B is a diagram illustrating an example of the line input screen 910 displayed in the terminal apparatus 3. The line input screen 910 comprises, for example, a line type/number input object 911, a wound-line length input object 912, a setting button 913, and a return button 914.

The line type/number input object 911 is, for example, a drop-down list that a user uses to select and input a type and a number of a fishing line to be input before inputting the fishing line. If the user has designated the line type/number input object 911, a list including one or more names indicating "line type and number" is displayed. If the user has selected any of the one or more names indicating the "line type and number", a display of the list is terminated, and the selected name is displayed in the line type/number input object 911. As a result of this, "line type and number" that corresponds to the name selected by the user is designated.

The wound-line length input object 912 is a drop-down list that a user uses to select and input a wound-line length of a fishing line to be input before inputting the fishing line, similarly to the line type/number input object 911. If the user has designated the wound-line length input object 912, a list including one or more names indicating a "wound-line length" (for example, "300 m") is displayed. If the user has selected any of the one or more names indicating the "wound-line length", a display of the list is terminated, and the selected name is displayed in the wound-line length input object 912. As a result of this, a "wound-line length" that corresponds to the name selected by the user is designated.

The setting button 913 is a button object for starting processing for storing information indicating the "line type and number" designated by the user and information indicating the "wound-line length" designated by the user, as reel information in the reel storage 22 of the fishing electric reel 2. Hereinafter, in some cases, line input information is used as a generic term of the information indicating the "line type and number" designated by the user and the information indicating the "wound-line length" designated by the user. Gray-out processing may be performed on the setting button 913 in such a way that a user fails to designate the setting button 913, until the user has designated the "line type and number" and the "wound-line length" in the line type/number input object 911 and the wound-line length input object 912. Furthermore, in a case where the user has operated the terminal operating part 34 to provide an instruction to the return button 914, the display processing unit 361 of the terminal apparatus 3 terminates a display of the line input screen 910, and displays the menu screen 900 in the terminal display unit 35.

Return to FIG. 14A. In a case where the user has operated the terminal operating part 34 to provide an instruction to the setting button 913 in the line input screen 910, the display processing unit 361 of the terminal apparatus 3 displays a transmission screen 1000 in the terminal display unit 35 (step S202). FIG. 10A is a diagram illustrating an example of the transmission screen 1000 displayed in the terminal apparatus 3. The transmission screen 1000 comprises, for example, a setting start button 1001 and a return button 1002. The setting start button 1001 is a button object for transmitting, to the fishing electric reel 2, the line input information and time information indicating current time.

In a case where the user has operated the terminal operating part 34 to provide an instruction to the setting start button 1001, the terminal transmitter 362 of the terminal apparatus 3 transmits the line input information input by the user and the time information, by using the first terminal communication unit 31 (step S203). Note that the transmission process of step S203 is performed in a case where short-range wireless communication has been established between the reel communication unit 21 of the fishing electric reel 2 and the first terminal communication unit 31 of the terminal apparatus 3. Furthermore, in a case where the user has operated the terminal operating part 34 to provide an instruction to the return button 1002, the display processing unit 361 of the terminal apparatus 3 terminates a display of the transmission screen 1000, and displays the menu screen 900 in the terminal display unit 35.

The reel receiver 271 of the fishing electric reel 2 receives the line input information and the time information that have been transmitted from the terminal apparatus 3, by using the reel communication unit 21. The setting unit 273 of the fishing electric reel 2 performs setting processing for storing the line input information (the "line type and number" and the "wound-line length") and the time information that have been received, as line input information to be included in reel information, in the reel storage 22 (step S204). Then, in response to the termination of the setting processing, the reel transmitter 272 of the fishing electric reel 2 transmits setting completion information for reporting the termination of the setting processing, to the terminal apparatus 3 by using the reel communication unit 21 (step S205).

The terminal receiver 363 of the terminal apparatus 3 receives the setting completion information transmitted from the fishing electric reel 2, by using the first terminal communication unit 31. In response to the reception of the setting completion information, the display processing unit 361 of the terminal apparatus 3 displays the menu screen 900 in the terminal display unit 35 (step S206).

Figure 14B:
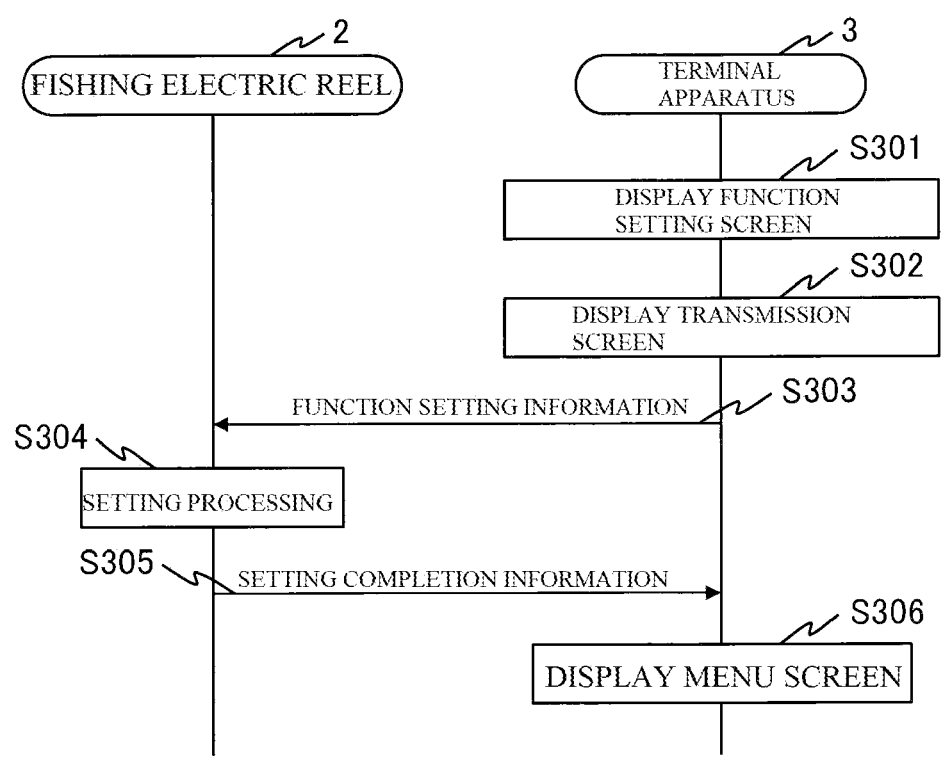
FIG. 14B is a diagram illustrating another example of the operation sequence of the reel information management system.

Another example of the operation sequence performed by the reel information management system 1 relating to processing for setting the function setting information, as illustrated in FIG. 14B, is described below with reference to FIG. 10B.

As illustrated in FIG. 14B, first, in a case where a user has input an instruction to display the function setting screen 1010, by using the terminal operating part 34 of the terminal apparatus 3, the display processing unit 361 of the terminal apparatus 3 displays the function setting screen 1010 in the terminal display unit 35 (step S301). The instruction to display the function setting screen 1010 is input, for example, in a case where the user has operated the terminal operating part 34 to provide an instruction to the function setting button 902 in the menu screen 900 displayed in the terminal display unit 35.

Figure 10B:
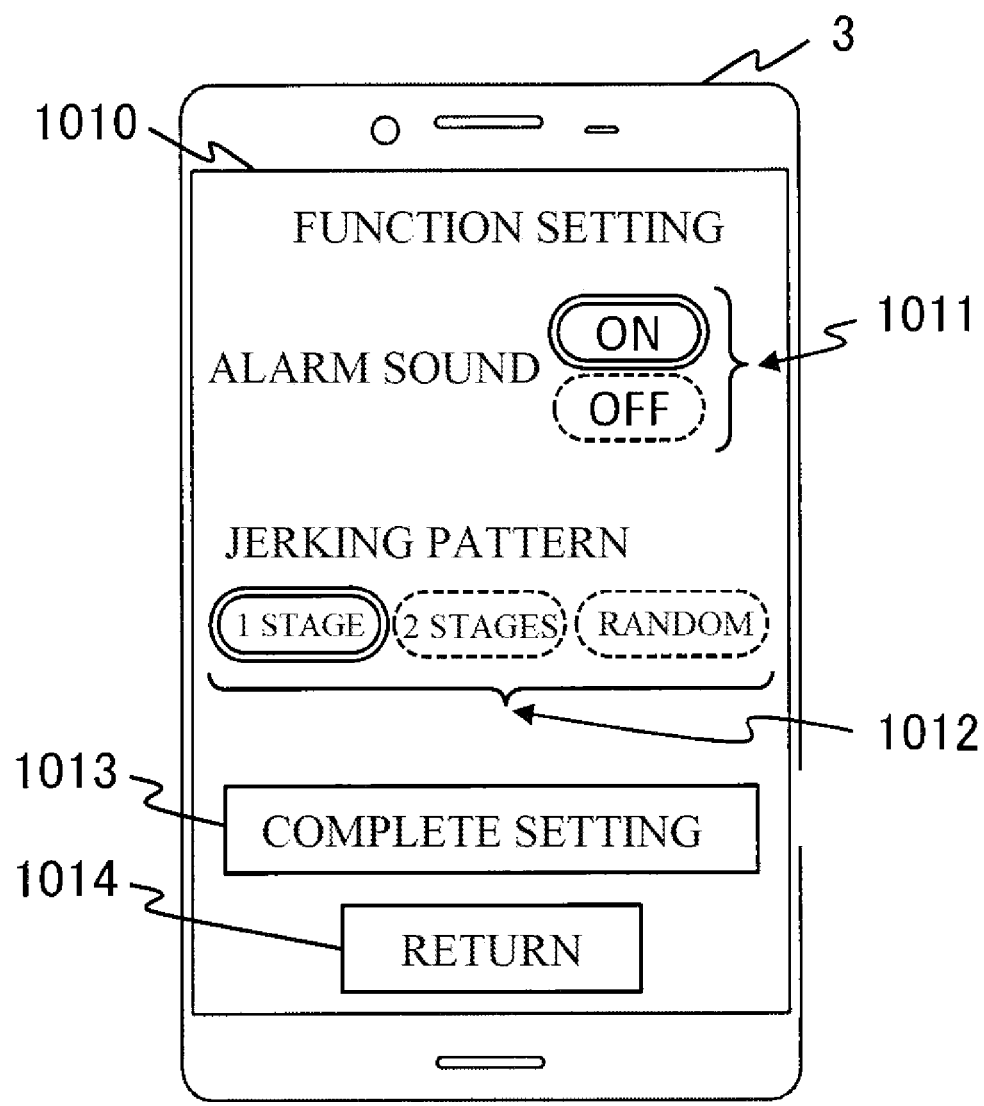
FIG. 10B is a diagram illustrating an example of a function setting screen displayed in the terminal apparatus.

FIG. 10B is a diagram illustrating an example of the function setting screen 1010 displayed in the terminal apparatus 3. The function setting screen 1010 comprises, for example, a first function selection object 1011, a second function selection object 1012, a setting button 1013, and a return button 1014.

The first function selection object 1011 and the second function selection object 1012 are button objects for setting various functions to be achieved according to the reel control program in the fishing electric reel 2. In the example illustrated in FIG. 10B, the first function selection object 1011 is a button object for setting whether alarm sound will be output in the fishing electric reel 2. Furthermore, the second function selection object 1012 is a button object for selecting one pattern of "jerking" in the fishing electric reel 2. The first function selection object 1011 and the second function selection object 1012 at a time when the function setting screen 1010 is displayed may be displayed in a state where any button has been selected according to function setting information stored in the terminal storage 33. In the example illustrated in FIG. 10B, an output of alarm sound has been set in the function setting information, and therefore a corresponding button has been selected in the first function selection object 1011. A pattern of "jerking" has been set to "one stage" in the function setting information, and therefore a corresponding button has been selected in the second function selection object 1012. Furthermore, the first function selection object 1011 may be used to set another function rather than the setting of alarm sound, and the second function selection object 1012 may be used to set another function rather than the setting of a pattern of "jerking". Examples of another function to be set include the content (winding speed, a counter from the bottom, a remaining time period of winding, or the like) to be displayed in a sub-counter, whether "slight winding" will be performed, and the like. Another function to be set may be any function that can be achieved according to the reel control program. The function setting screen 1010 includes two types of function setting objects, the first function selection object 1011 and the second function selection object 1012. However, only the first function selection object 1011 may be included, or three or more types of function selection objects may be included.

The setting button 1013 is a button object for starting processing for storing function setting information indicating the setting of the function designated by the user, in the reel storage 22 of the fishing electric reel 2. In a case where the user has operated the terminal operating part 34 to provide an instruction to the return button 1014, the display processing unit 361 of the terminal apparatus 3 terminates a display of the function setting screen 1010, and displays the menu screen 900 in the terminal display unit 35.

Return to FIG. 14B. In a case where the user has operated the terminal operating part 34 to provide an instruction to the setting button 1013 in the function setting screen 1010, the display processing unit 361 of the terminal apparatus 3 displays the transmission screen 1000 (FIG. 10A) in the terminal display unit 35 (step S302).

In a case where the user has operated the terminal operating part 34 to provide an instruction to the setting start button 1001, the terminal transmitter 362 of the terminal apparatus 3 transmits the function setting information input by the user, by using the first terminal communication unit 31 (step S303). Note that the transmission process of step S303 is performed in a case where short-range wireless communication has been established between the reel communication unit 21 of the fishing electric reel 2 and the first terminal communication unit 31 of the terminal apparatus 3. Furthermore, in a case where the user has operated the terminal operating part 34 to provide an instruction to the return button 1002, the display processing unit 361 of the terminal apparatus 3 terminates a display of the transmission screen 1000, and displays the menu screen 900 in the terminal display unit 35.

The reel receiver 271 of the fishing electric reel 2 receives the function setting information transmitted from the terminal apparatus 3, by using the reel communication unit 21. The setting unit 273 of the fishing electric reel 2 performs setting processing for storing the received function setting information, as function setting information to be included in reel information, in the reel storage 22 (step S304). Note that in a case where the function setting information is not included in the reel information, the function setting information is stored as information that is different from the reel information, in the reel storage 22. Then, in response to the termination of the setting processing, the reel transmitter 272 of the fishing electric reel 2 transmits setting completion information for reporting the termination of the setting processing, to the terminal apparatus 3 by using the reel communication unit 21 (step S305). Note that the driving control unit 274 of the fishing electric reel 2 performs predetermined processing and operation that correspond to the newly set function setting information, in accordance with each command of the reel control program.

The terminal receiver 363 of the terminal apparatus 3 receives the setting completion information transmitted from the fishing electric reel 2, by using the first terminal communication unit 31. In response to the reception of the setting completion information, the display processing unit 361 of the terminal apparatus 3 displays the menu screen 900 in the terminal display unit 35 (step S306).

Figure 15A:
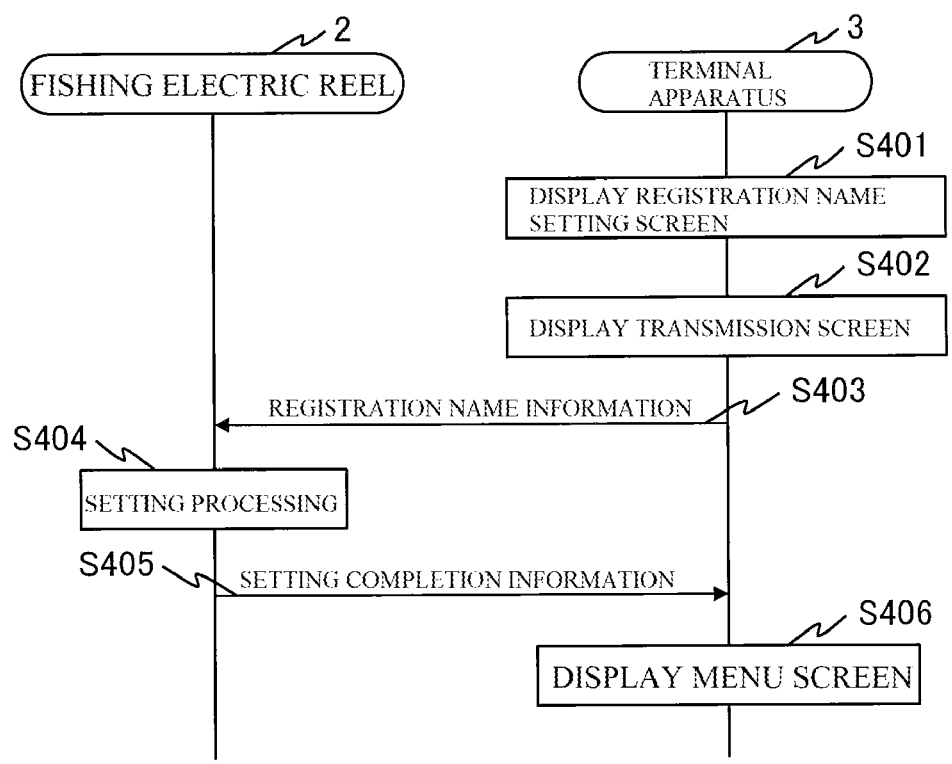
FIG. 15A is a diagram illustrating another example of the operation sequence of the reel information management system.

Another example of the operation sequence performed by the reel information management system 1 relating to processing for setting the registration name information, as illustrated in FIG. 15A, is described below with reference to FIG. 11A.

As illustrated in FIG. 15A, first, in a case where a user has input an instruction to display the registration name setting screen 1100, by using the terminal operating part 34 of the terminal apparatus 3, the display processing unit 361 of the terminal apparatus 3 displays the registration name setting screen 1100 in the terminal display unit 35 (step S401). The instruction to display the registration name setting screen 1100 is input, for example, in a case where the user has operated the terminal operating part 34 to provide an instruction to the registration name setting button 903 in the menu screen 900 displayed in the terminal display unit 35.

Figure 11A:
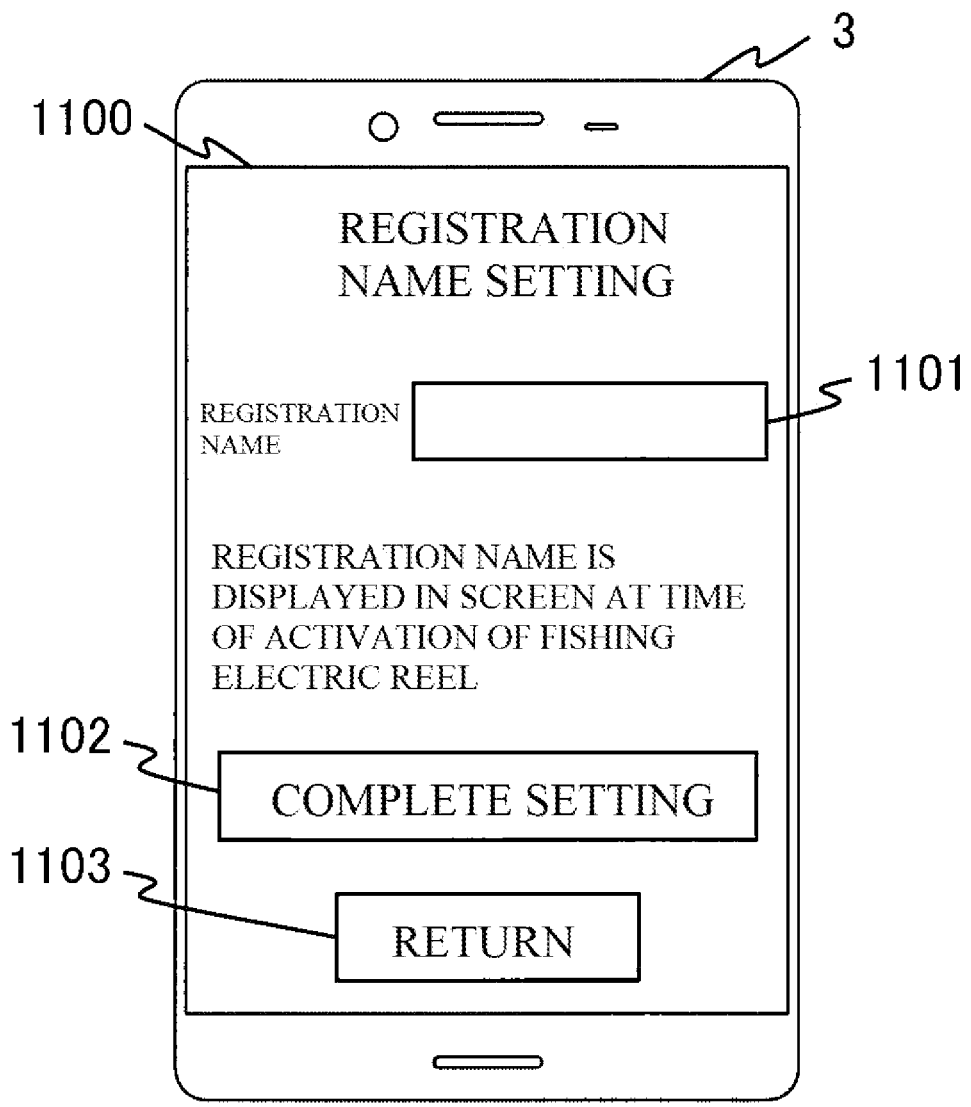
FIG. 11A is a diagram illustrating an example of a registration name setting screen displayed in the terminal apparatus.

FIG. 11A is a diagram illustrating an example of the registration name setting screen 1100 displayed in the terminal apparatus 3. The registration name setting screen 1100 comprises, for example, a registration name input object 1101, a setting button 1102, and a return button 1103. The registration name input object 1101 is a text box that the user uses to input a character string of a registration name to be registered.

The setting button 1102 is a button object for starting processing for storing registration name information indicating a registration name input by the user, as reel information, in the reel storage 22 of the fishing electric reel 2. Gray-out processing may be performed on the setting button 1102 in such a way that the user fails to designate the setting button 1102, until the user has input the registration name in the registration name input object 1101. Furthermore, in a case where the user has operated the terminal operating part 34 to provide an instruction to the return button 1103, the display processing unit 361 of the terminal apparatus 3 terminates a display of the registration name setting screen 1100, and displays the menu screen 900 in the terminal display unit 35.

Return to FIG. 15A. In a case where the user has operated the terminal operating part 34 to provide an instruction to the setting button 1102 in the registration name setting screen 1100, the display processing unit 361 of the terminal apparatus 3 displays the transmission screen 1000 (FIG. 10A) in the terminal display unit 35 (step S402).

In a case where the user has operated the terminal operating part 34 to provide an instruction to the setting start button 1001, the terminal transmitter 362 of the terminal apparatus 3 transmits the registration name information input by the user, by using the first terminal communication unit 31 (step S403). Note that the transmission process of step S403 is performed in a case where short-range wireless communication has been established between the reel communication unit 21 of the fishing electric reel 2 and the first terminal communication unit 31 of the terminal apparatus 3. Furthermore, in a case where the user has operated the terminal operating part 34 to provide an instruction to the return button 1002, the display processing unit 361 of the terminal apparatus 3 terminates a display of the transmission screen 1000, and displays the menu screen 900 in the terminal display unit 35.

The reel receiver 271 of the fishing electric reel 2 receives the registration name information transmitted from the terminal apparatus 3, by using the reel communication unit 21. The setting unit 273 of the fishing electric reel 2 performs setting processing for storing the received registration name information, as registration name information to be included in reel information, in the reel storage 22 (step S404). Then, in response to the termination of the setting processing, the reel transmitter 272 of the fishing electric reel 2 transmits setting completion information for reporting the termination of the setting processing, to the terminal apparatus 3 by using the reel communication unit 21 (step S405).

The terminal receiver 363 of the terminal apparatus 3 receives the setting completion information transmitted from the fishing electric reel 2, by using the first terminal communication unit 31. In response to the reception of the setting completion information, the display processing unit 361 of the terminal apparatus 3 displays the menu screen 900 in the terminal display unit 35 (step S406).

Figure 11B:
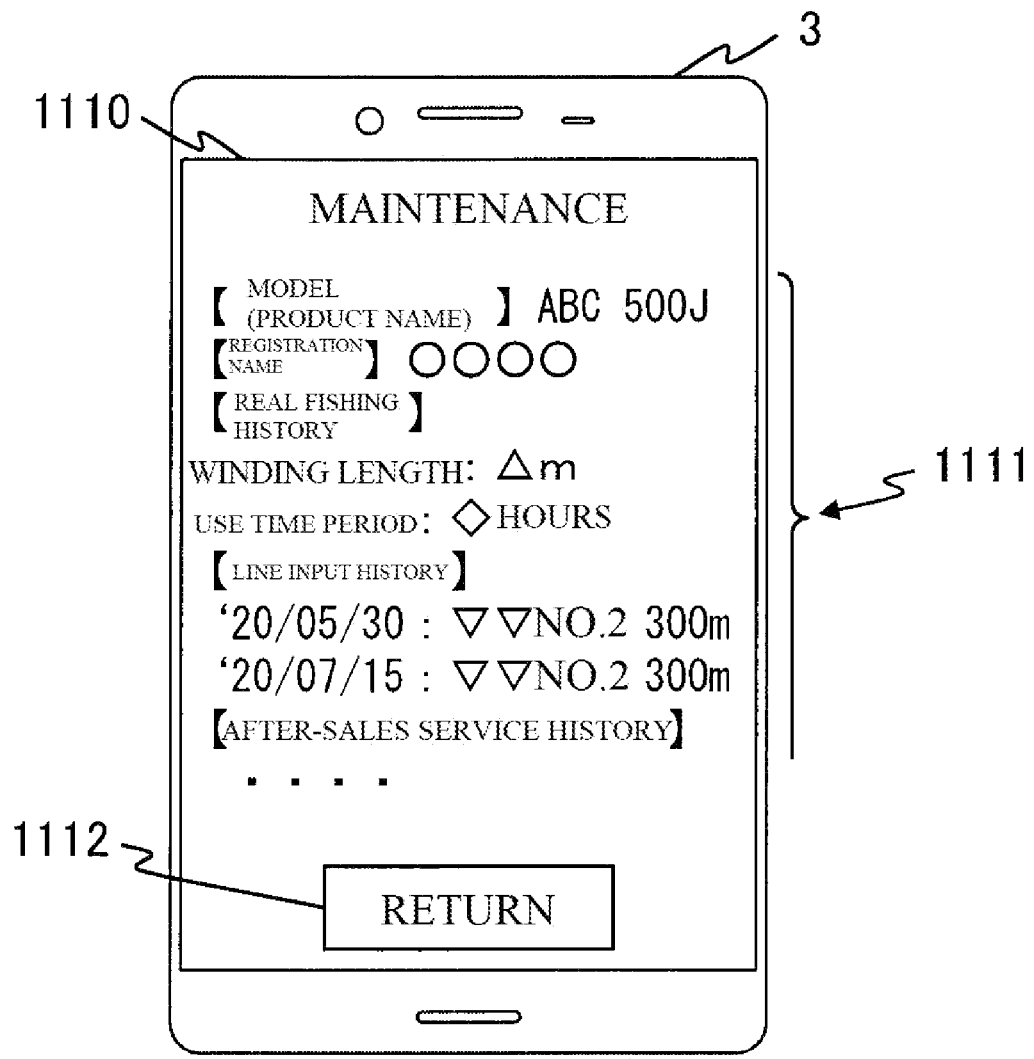
FIG. 11B is a diagram illustrating an example of a maintenance screen displayed in the terminal apparatus.
Figure 15B:
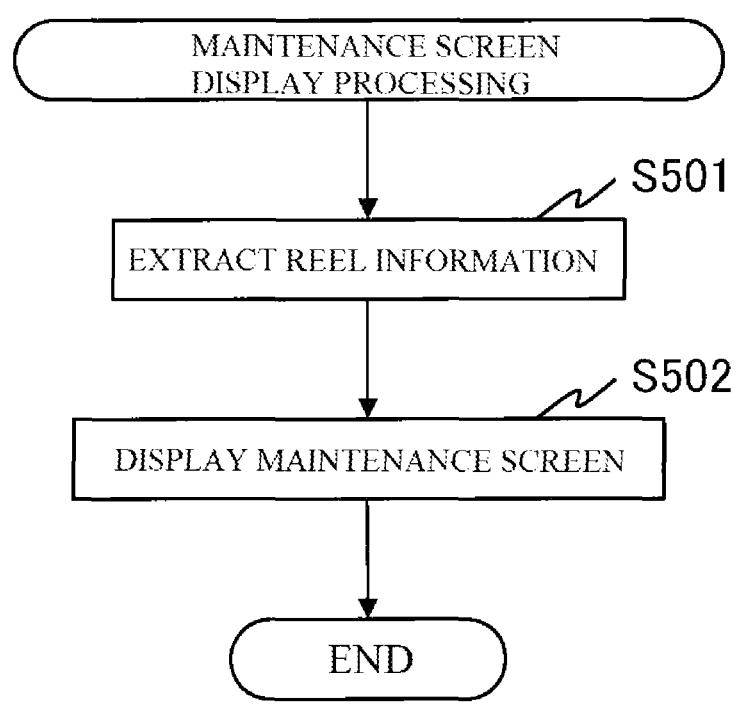
FIG. 15B is a diagram illustrating an example of an operation flow of maintenance screen display processing.

A diagram illustrating an example of an operation flow of maintenance screen display processing, as illustrated in FIG. 15B, is described below with reference to FIG. 11B.

As illustrated in FIG. 15B, first, in a case where a user has input an instruction to display the maintenance screen 1110, by using the terminal operating part 34 of the terminal apparatus 3, the display processing unit 361 of the terminal apparatus 3 extracts the reel information stored in the terminal storage 33 (step S501). The instruction to display the maintenance screen 1110 is input, for example, in a case where the user has operated the terminal operating part 34 to provide an instruction to the maintenance display button 904 in the menu screen 900 displayed in the terminal display unit 35.

Then, the display processing unit 361 displays the maintenance screen 1110 including the extracted reel information, in the terminal display unit 35 (step S502), and terminates the maintenance screen display processing. FIG. 11B is a diagram illustrating an example of the maintenance screen 1110 displayed in the terminal apparatus 3. The maintenance screen 1110 comprises, for example, a reel information display region 1111 and a return button 1112. In the reel information display region 1111, the extracted reel information is displayed. Note that in a case where the reel information does not include the function setting information, the function setting information may be displayed in the reel information display region 1111. In a case where the user has operated the terminal operating part 34 to provide an instruction to the return button 1112, the display processing unit 361 of the terminal apparatus 3 terminates a display of the maintenance screen 1110, and displays the menu screen 900 in the terminal display unit 35. Conventionally, the reel display unit 23 has a problem in which a display of the reel information has poor list performance. However, the terminal display unit 35 displays the maintenance screen 1110, and therefore a user can view various pieces of information (a model name (a product name), date of an input of the line input information, or the like).

In the maintenance screen 1110, various types of display information may be displayed together with the reel information or instead of the reel information, and an example of the various types of display information is URL information for a transition to a home page screen for maintenance that can be downloaded from an external Web server apparatus. An example of processing for displaying various types of display information is described below. For example, in a case where a user has operated the terminal operating part 34 to provide an instruction relating to URL information (or a button or the like that is associated with the URL information), the terminal transmitter 362 transmits a service provision instruction to an external Web server apparatus by using the second terminal communication unit 32. Next, the terminal receiver 363 receives display information for displaying a screen that has been transmitted from the Web server apparatus in response to the service provision instruction, by using the second terminal communication unit 32. Then, the display processing unit 361 displays a screen based on the received display information, and the display processing is terminated. Note that the screen based on the received display information is a screen for displaying information relating to a product such as the fishing electric reel 2 or another fishing tackle, or the like, a screen for receiving various services including registration, such as an application for the purchase of the fishing electric reel 2 or another product, and/or the like. The screen based on the received display information may be any screen if the screen has been generated by a manufacturer, a seller, an agency, an affiliate program participant, or the like of the fishing electric reel 2 or another fishing tackle. As described above, conventionally, there has been a problem in which a user fails to perform a simple operation to obtain information relating to the fishing electric reel 2 or another product that the user possesses or receive various services. However, the maintenance screen 1110 displays various pieces of information, and therefore a user can obtain detailed information, or can receive various services including registration, such as application.

As described above, in the reel information management system 1, a user only operates the terminal apparatus 3, and therefore the reel control program of the fishing electric reel 2 can be updated, and the reel information can be set. Therefore, the user can manage information relating to the fishing electric reel 2, by only using the terminal apparatus 3 without going to a fishing tackle store or the like and asking for help of an expert.

(Variation 1)

Note that the present disclosure is not limited to the embodiment described above. For example, in a case where the terminal receiver 363 of the terminal apparatus 3 has received the updating completion information transmitted from the fishing electric reel 2 (step S113), the display processing unit 361 of the terminal apparatus 3 may change a screen for setting or displaying the reel information relating to the fishing electric reel 2 (the menu screen 900, the line input screen 910, the function setting screen 1010, the registration name setting screen 1100, and the maintenance screen 1110) to a screen that corresponds to the latest reel control program.

Figure 12A:
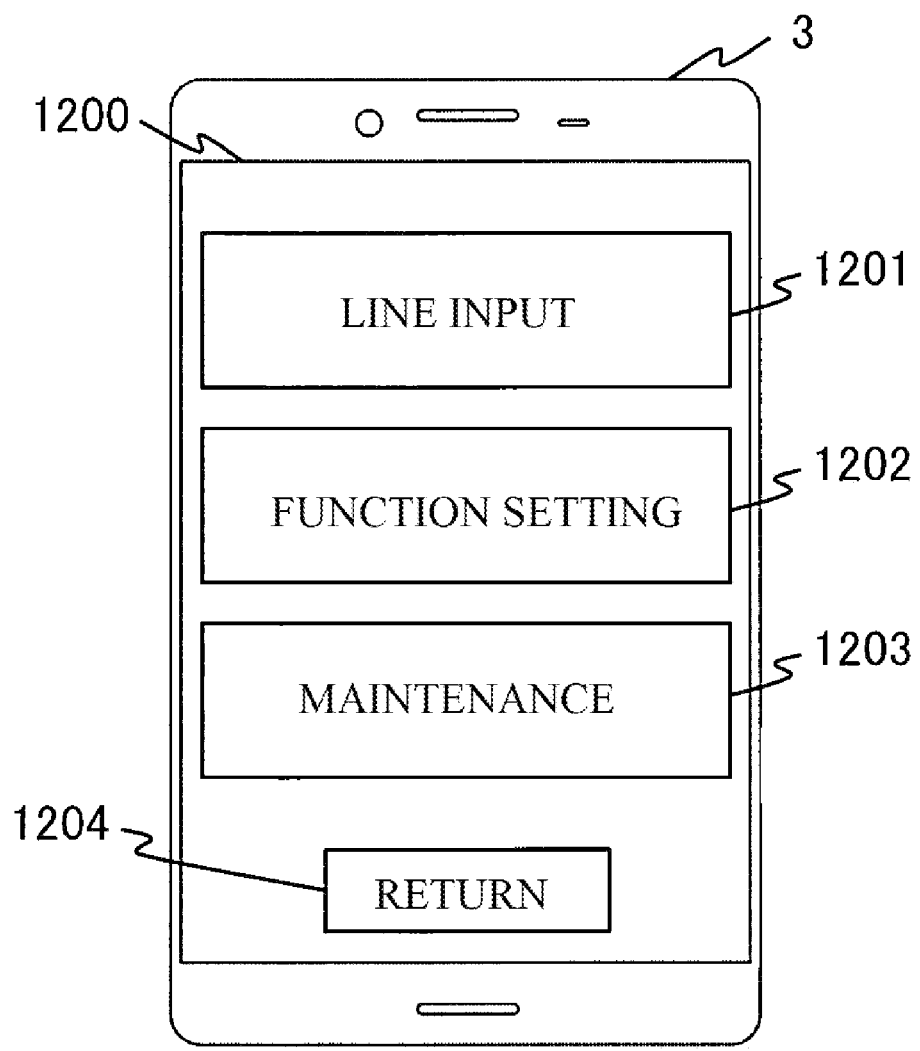
FIG. 12A is a diagram illustrating another example of the menu screen displayed in the terminal apparatus.

FIG. 12A is a diagram illustrating another example of the menu screen displayed in the terminal apparatus 3. The menu screen 1200 illustrated in FIG. 12A is a screen for setting functions achieved according to a reel control program of a predetermined version. In the fishing electric reel 2 controlled according to the reel control program of the predetermined version, a function of setting a registration name is not achieved, and therefore the registration name setting button 903 is not displayed on the menu screen 1200. Then, if steps S112 and S113 in the operation sequence of FIG. 13 are performed, the function of setting the registration name is achieved in the fishing electric reel 2 controlled according to a reel control program of the latest version. Therefore, the menu screen 900 illustrated in FIG. 9A is displayed.

Figure 12B:
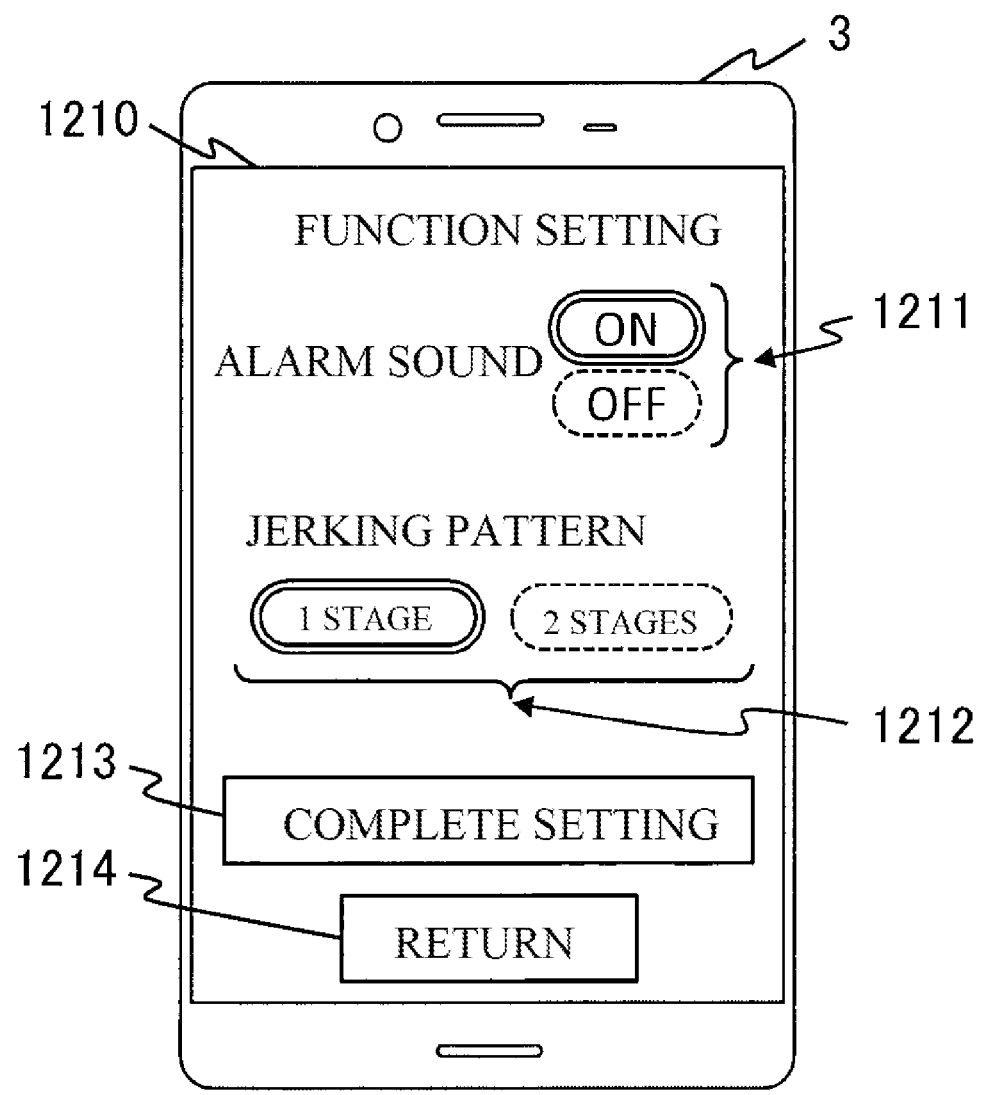
FIG. 12B is a diagram illustrating another example of the function setting screen displayed in the terminal apparatus.

FIG. 12B is a diagram illustrating another example of the function setting screen displayed in the terminal apparatus 3. The function setting screen 1210 illustrated in FIG. 12B is a screen for setting functions achieved according to a reel control program of a predetermined version. In the fishing electric reel 2 controlled according to the reel control program of the predetermined version, a function of only setting two patterns of "jerking" is achieved. Therefore, on the function setting screen 1210, a second function selection object 1211 that enables two patterns of "jerking" to be set is displayed. Then, if steps S112 and S113 in the operation sequence of FIG. 13 are performed, a function of setting the pattern "random" of "jerking" is achieved in the fishing electric reel 2 controlled according to a reel control program of the latest version. Therefore, the function setting screen 1010 illustrated in FIG. 10B is displayed.

A change in a screen is not limited to a change from the menu screen 1200 to the menu screen 900, and a change from the function setting screen 1210 to the function setting screen 1010. Furthermore, the line input screen 910 and the registration name setting screen 1100 may be changed to a screen that corresponds to the latest reel control program.

As described above, in the reel information management system 1, in a case where the reel control program of the fishing electric reel 2 has been updated to the latest reel control program, at least one of the menu screen 900, the line input screen 910, the function setting screen 1010, and the registration name setting screen 1100 can be changed to a screen that corresponds to the latest reel control program. As a result of this, a user can manage the reel control program and the reel information of the fishing electric reel 2, by only using the terminal apparatus 3 without going to a fishing tackle store or the like and asking for help of an expert.
(Variation 2)

Some of the respective processes illustrated in FIGS. 13 to 15B may be omitted, or the respective processes may be performed in an order that is different from the order illustrated in FIGS. 13 to 15B. For example, the process of step S107 for displaying the program request screen 800 may be omitted. In this case, in the determination of step S106 as to matching the latest version information, in a case where non-matching has been determined (step S106—No), the process of step S108 for transmitting a program request is immediately performed. Furthermore, the process of step S108 for transmitting the program request may be performed simultaneously with the process of step S104 for transmitting a version information request, or immediately after or immediately before the process of step S104 for transmitting the version information request. In this case, in the determination of step S106 as to matching the latest version information, in a case where non-matching has been determined (step S106—No), the process of step S107 for displaying the program request screen 800 is not performed.
(Variation 3)

In a case where the function setting information is not included in the reel information, in step S103, the reel transmitter 272 of the fishing electric reel 2 may extract the reel information and the function setting information that have been stored in the reel storage 22, and may transmit the reel information and the function setting information that have been extracted, to the terminal apparatus 3 by using the reel communication unit 21.
(Variation 4)

The reel information stored in the terminal storage 33 may be displayed in the reel display unit 23 of the fishing electric reel 2. For example, normally, during an activation time period after the activation of the fishing electric reel 2 and before the displaying of a normal screen (not illustrated), a predetermined logo image or the like is displayed in the reel display unit 23. In a case where the reel information stored in the terminal storage 33 comprises the registration name information, the driving control unit 274 of the fishing electric reel 2 may display the predetermined logo image during the activation time period, and may then display a character string of a registration name indicated by the registration name information. An example of display processing at the time of activation is described below. In a case where a user has operated a predetermined reel operating part 24 to provide an activation instruction, the driving control unit 274 of the fishing electric reel 2 displays a predetermined logo image in the reel display unit 23 during a first activation time period after activation, and determines whether the reel information stored in the terminal storage 33 comprises the registration name information. Next, in a case where the reel information stored in the terminal storage 33 comprises the registration name information, the driving control unit 274 displays a character string of a registration name indicated by the registration name information, in the reel display unit 23 during a second activation time period after the elapse of the first activation time period. Then, when the second activation time period has passed, a normal screen is displayed in the reel display unit 23. As described above, in the fishing electric reel 2, a user only sets a registration name, and therefore a variety of display aspects can be provided during an activation time period of the fishing electric reel 2.
(Variation 5)

The storage processing unit 364 of the terminal apparatus 3 stores, in the terminal storage 33, the reel information that has been transmitted from the fishing electric reel 2 (step S103). The stored reel information may be deleted in response to the termination of the terminal control program and/or the termination (shutdown) of power supply to the terminal apparatus 3. In a case where the function setting information is not included in the reel information, similarly, the storage processing unit 364 may delete the stored function setting information in response to the termination of the terminal control program and/or the termination (shutdown) of power supply to the terminal apparatus 3.

REFERENCE SIGNS LIST

1 Reel information management system
2 Fishing electric reel

21 Reel communication unit
22 Reel storage
23 Reel display unit
24 Reel operating part
25 Driving circuit
26 Driving motor
27 Reel control unit
271 Reel receiver
272 Reel transmitter
273 Setting unit
274 Driving control unit
3 Terminal apparatus
31 First terminal communication unit
32 Second terminal communication unit
33 Terminal storage
34 Terminal operating part
35 Terminal display unit
36 Terminal processing unit
361 Display processing unit
362 Terminal transmitter
363 Terminal receiver
364 Storage processing unit
4 Server apparatus
41 Server communication unit
42 Server storage
43 Server processing unit
431 Server receiver
432 Server transmitter
5 Base station
6 Mobile communication network
7 Gateway
8 Internet

What is claimed is:

1. A non-transitory computer-readable medium storing thereon a terminal control program of a terminal apparatus that can display a screen for setting function setting information relating to a function of a fishing electric reel controlled according to a reel control program, the terminal control program causing the terminal apparatus to perform:
   transmitting a first request to the fishing electric reel in response to an operation of a user, the first request requesting that the function setting information relating to the function of the fishing electric reel be transmitted;
   receiving the function setting information that has been automatically transmitted from the fishing electric reel in response to the first request;
   storing the function setting information that has been received;
   displaying a first setting screen that the user uses to set each of a plurality of the functions of the fishing electric reel; and
   transmitting, to the fishing electric reel, information indicating setting of each of the plurality of the functions that has been set by the user, and causing the information indicating the setting of each of the plurality of the functions to be stored as the function setting information,
   wherein in the displaying of the first setting screen, an operation object is displayed on the first setting screen in a state where each of the plurality of the functions has been set on the basis of the function setting information that has been stored, the operation object being used to set each of the plurality of the functions, wherein
   the terminal apparatus is caused to perform:
   displaying a second setting screen that the user uses to set a registration name of the fishing electric reel; and
   transmitting, to the fishing electric reel, information indicating the registration name that has been set by the user, and causing the fishing electric reel to store the information indicating the registration name,
   in a case where the information indicating the registration name has been stored, the registration name is displayed in a display unit of the fishing electric reel at a time of activating the fishing electric reel, and
   in a case where the information indicating the registration name has not been stored, the registration name is not displayed in the display unit of the fishing electric reel at the time of activating the fishing electric reel.

2. The non-transitory computer-readable medium according to claim 1, wherein
   in the receiving of the function setting information, the terminal apparatus is caused to perform:
   receiving a product name and the registration name of the fishing electric reel, together with the function setting information, in response to the first request, and
   the terminal apparatus is caused to further perform displaying the product name and the registration name in accordance with an instruction of the user.

3. A terminal apparatus that can display a screen for setting function setting information relating to a function of a fishing electric reel controlled according to a reel control program, the terminal apparatus comprising a processor programmed to function as:
   a terminal transmitter that transmits information to the fishing electric reel;
   a terminal receiver that receives the information from the fishing electric reel;
   a storage processing unit; and
   a display processing unit,
   wherein the terminal transmitter transmits a first request to the fishing electric reel in response to an operation of a user, the first request requesting that the function setting information relating to the function of the fishing electric reel be transmitted,
   the terminal receiver receives the function setting information that has been automatically transmitted from the fishing electric reel in response to the first request,
   the storage processing unit stores the function setting information that has been received,
   the display processing unit displays a first setting screen that the user uses to set each of a plurality of the functions of the fishing electric reel,
   the terminal transmitter transmits, to the fishing electric reel, information indicating setting of each of the plurality of the functions that has been set by the user, and causes the information indicating the setting of each of the plurality of the functions to be stored as the function setting information, and
   in the displaying of the first setting screen, an operation object is displayed on the first setting screen in a state where each of the plurality of the functions has been set on the basis of the function setting information that has been stored, the operation object being used to set each of the plurality of the functions, wherein
   the display processing unit displays a second setting screen that the user uses to set a registration name of the fishing electric reel,
   the terminal transmitter transmits, to the fishing electric reel, information indicating the registration name that has been set by the user, and causes the fishing electric reel to store the information indicating the registration name, in a case where the information indicating the registration name has been stored, the registration name is displayed in a display unit of the fishing electric reel at a time of activating the fishing electric reel, and in a case where the information indicating the registration name has not been stored, the registration name is not displayed in the display unit of the fishing electric reel at the time of activating the fishing electric reel.

4. A reel information management system comprising:

a fishing electric reel that is controlled according to a reel control program; and a terminal apparatus that can display a screen for setting function setting information relating to a function of the fishing electric reel, wherein the fishing electric reel comprises:

a reel storage that stores the function setting information relating to the function of the fishing electric reel;

a reel receiver that receives request information from the terminal apparatus;

a reel transmitter that transmits information to the terminal apparatus; and a setting unit, the terminal apparatus comprises a processor programmed to function as:

a terminal transmitter that transmits the information to the fishing electric reel;

a terminal receiver that receives the information from the fishing electric reel;

a storage processing unit; and a display processing unit, the terminal transmitter transmits a first request to the fishing electric reel in response to an operation of a user, the first request requesting that the function setting information relating to the function of the fishing electric reel be transmitted, the reel receiver receives the first request that has been transmitted from the terminal apparatus, the reel transmitter transmits the function setting information that has been stored in the reel storage to the terminal apparatus, in response to the first request, the terminal receiver receives the function setting information that has been transmitted from the fishing electric reel, the storage processing unit stores the function setting information that has been received, the display processing unit displays a first setting screen that the user uses to set each of a plurality of the functions of the fishing electric reel, the terminal transmitter transmits, to the fishing electric reel, information indicating setting of each of the plurality of the functions that has been set by the user, and causes the information indicating the setting of each of the plurality of the functions to be stored as the function setting information, the reel receiver receives the information indicating the setting of each of the plurality of the functions and having been transmitted from the terminal apparatus, and the setting unit stores, in the reel storage, the information indicating the setting of each of the plurality of the functions as the function setting information, the information indicating the setting of each of the plurality of the functions having been received, wherein the display processing unit displays a second setting screen that the user uses to set a registration name of the fishing electric reel, the terminal transmitter transmits, to the fishing electric reel, information indicating the registration name that has been set by the user, and causes the fishing electric reel to store the information indicating the registration name, in a case where the information indicating the registration name has been stored, the registration name is displayed in a display unit of the fishing electric reel at a time of activating the fishing electric reel, and in a case where the information indicating the registration name has not been stored, the registration name is not displayed in the display unit of the fishing electric reel at the time of activating the fishing electric reel.

* * * * *